US009595225B2

(12) United States Patent
Ebisuno et al.

(10) Patent No.: US 9,595,225 B2

(45) Date of Patent: Mar. 14, 2017

(54) DISPLAY DEVICE AND METHOD OF DRIVING THE SAME

(71) Applicant: JOLED INC., Tokyo (JP)

(72) Inventors: Kouhei Ebisuno, Kyoto (JP); Toshiyuki Kato, Osaka (JP); Shinya Ono, Osaka (JP)

(73) Assignee: JOLED INC., Tokyo (JP)

( * ) Notice: Subject to any disclaimer, the term of this patent is extended or adjusted under 35 U.S.C. 154(b) by 639 days.

(21) Appl. No.: 14/004,430

(22) PCT Filed: Oct. 25, 2012

(86) PCT No.: PCT/JP2012/006842
§ 371 (c)(1),
(2) Date: Sep. 11, 2013

(87) PCT Pub. No.: WO2013/094104
PCT Pub. Date: Jun. 27, 2013

(65) Prior Publication Data

US 2014/0062989 A1 Mar. 6, 2014

(30) Foreign Application Priority Data

Dec. 20, 2011 (JP) ................................ 2011-278821

(51) Int. Cl.
*G06F 3/038* (2013.01)
*G09G 3/32* (2016.01)

(52) U.S. Cl.
CPC ......... *G09G 3/3241* (2013.01); *G09G 3/3225* (2013.01); *G09G 2300/0426* (2013.01);
(Continued)

(58) Field of Classification Search
CPC ............... G09G 3/3241; G09G 3/3225; G09G 2300/0426; G09G 2320/0223;
(Continued)

(56) References Cited

U.S. PATENT DOCUMENTS 7,345,660 B2 3/2008 Mizukoshi et al.
8,199,075 B2 6/2012 Marx et al.
(Continued)

FOREIGN PATENT DOCUMENTS

JP 2002-229506 8/2002
JP 2003-195798 7/2003
(Continued)

OTHER PUBLICATIONS

International Search Report, mailed Dec. 18, 2012, for corresponding International Application No. PCT/JP2012/006842.

*Primary Examiner* — Kent Chang
*Assistant Examiner* — Mark Edwards
(74) *Attorney, Agent, or Firm* — Greenblum & Bernstein, P.L.C.

(57) ABSTRACT

A display device includes a voltage drop amount calculating circuit that regulates a power source voltage, a power wire network in the organic EL display unit includes a row-wise resistance component Rah and a column-wise resistance component Rav, and the voltage drop amount calculating circuit divides the organic EL display unit into blocks each made up of pixels in Xv rows and Xh columns, and sets, for each of the blocks, a row-wise resistance component Rah' to a value obtained by multiplying the resistance component Rah by (Xh/Xv), and sets, for each of the blocks, a column-wise resistance component Rav' to a value obtained by multiplying the resistance component Rav by (Xv/Xh), thereby estimating a distribution, for the respective blocks, of amounts of voltage drop which occurs in the power wire, and regulates, based on the distribution, a voltage to be supplied to the display unit.

20 Claims, 29 Drawing Sheets

(52) U.S. Cl.
CPC ............... *G09G 2320/0223* (2013.01); *G09G 2320/0233* (2013.01); *G09G 2320/0285* (2013.01); *G09G 2330/021* (2013.01); *G09G 2330/028* (2013.01)

(58) Field of Classification Search
CPC ... G09G 2320/0233; G09G 2320/0285; G09G 2330/021; G09G 2330/028
USPC .................................................... 345/76, 212
See application file for complete search history.

(56) References Cited

U.S. PATENT DOCUMENTS

| | | | | |
|---|---|---|---|---|
| 8,305,305 | B2 | 11/2012 | Ono | |
| 2003/0107542 | A1* | 6/2003 | Abe | G09G 3/22 345/89 |
| 2004/0150592 | A1 | 8/2004 | Mizukoshi et al. | |
| 2008/0284688 | A1* | 11/2008 | Marx | G09G 3/3233 345/76 |
| 2010/0109985 | A1 | 5/2010 | Ono | |
| 2011/0109611 | A1* | 5/2011 | Nakamura | G09G 3/20 345/211 |
| 2012/0327067 | A1 | 12/2012 | Kato | |

FOREIGN PATENT DOCUMENTS

| | | |
|---|---|---|
| JP | 2003-280590 | 10/2003 |
| JP | 2004-245955 | 9/2004 |
| JP | 2004-264793 | 9/2004 |
| JP | 2006-065148 | 3/2006 |
| JP | 2008-502015 | 1/2008 |
| JP | 2008-281798 | 11/2008 |
| JP | 2010-002770 | 1/2010 |
| JP | 2011-095506 | 5/2011 |
| WO | 2005/122120 | 12/2005 |
| WO | 2009/011092 | 1/2009 |
| WO | 2012/001991 | 1/2012 |

* cited by examiner

Image A

Anode side

FIG. 15

Voltage drop amount [V]

| Block rows \ Block columns | 1 | 2 | --- | 8 | --- | 16 |
|---|---|---|---|---|---|---|
| 1 | 0.0 | 0.0 | --- | 0.0 | --- | 0.0 |
| 2 | 1.0 | | --- | 9.0 | --- | 1.0 |
| ⋮ | ⋮ | ⋮ | --- | ⋮ | ⋱ | ⋮ |
| 5 | 1.0 | | --- | 9.0 | --- | 1.0 |
| ⋮ | ⋮ | ⋮ | --- | ⋮ | ⋱ | ⋮ |
| 9 | 0.0 | 0.0 | --- | 0.0 | --- | 0.0 |

FIG. 17

Voltage drop amount [V]

| Block rows \ Block columns | 1 | 2 | --- | 16 | --- | 32 |
|---|---|---|---|---|---|---|
| 1 | 0.0 | 0.0 | --- | 0.0 | --- | 0.0 |
| 2 | 0.5 | 1.0 | --- | 8.5 | --- | 0.5 |
| ⋮ | ⋮ | ⋮ | ⋱ | ⋮ | ⋱ | ⋮ |
| 9 | 0.5 | 1.0 | --- | 8.5 | --- | 0.5 |
| ⋮ | ⋮ | ⋮ | ⋱ | ⋮ | ⋱ | ⋮ |
| 18 | 0.0 | 0.0 | --- | 0.0 | --- | 0.0 |

DISPLAY DEVICE AND METHOD OF DRIVING THE SAME

TECHNICAL FIELD

The present invention relates to active-matrix display devices which use current-driven light-emitting elements represented by organic electroluminescence (EL) elements, and to methods of driving such display devices.

BACKGROUND ART

In general, the luminance of an organic electroluminescence (EL) element is dependent upon the drive current supplied to the element, and the luminance of the element increases in proportion to the drive current. Therefore, the power consumption of a display made up of organic EL elements is determined by the average of display luminance. Specifically, unlike liquid crystal displays, the power consumption of organic EL displays varies significantly depending on the displayed image. For example, in an organic EL display, the highest power consumption is required when displaying an all-white image, whereas, in the case of a typical natural image, power consumption which is approximately 20 to 40% that for all-white is considered to be sufficient.

However, because power source circuit design and battery capacity entail designing which assumes the case where the power consumption of a display becomes its highest, it is necessary to consider power consumption that is 3 to 4 times that for the typical natural image, thus becoming a hindrance to the lowering of power consumption and the miniaturization of devices.

In response, there is conventionally proposed a technique which reduces power consumption with practically no drop in display luminance, by detecting the peak value of video data and regulating the cathode voltage of the organic EL elements based on such detected data so as to reduce the power source voltage (for example, see Patent Literature (PTL) 1).

However, especially, in the case of the organic EL displays, only the above-stated regulation of the power source voltage based on video data is insufficient from the perspective of reducing power consumption. Since an organic EL element is a current-driven element, a current flows through anode-side power wires and cathode-side power wires, and a voltage drop proportionate to wire resistance occurs. When a measure is taken in consideration of this voltage drop, the reduction in power consumption is achieved. The measure for the above-stated voltage drop is described.

FIG. 20 is a circuit diagram illustrating a circuit configuration of a pixel which drives an organic EL element proposed in PTL 2.

In the pixel circuit configuration disclosed in the PTL 2, in the case where a source-drain voltage of a driver transistor Q1 that flows a current in and thereby drives an organic EL element is high and its operating point is in a saturation region even when a voltage drop occurs in the power wire, it is possible to appropriately display images set based on a data line voltage according to video signals.

However, in the case where the source-drain voltage of the driver transistor Q1 is low and its operating point is in a linear region, resistance components of an organic EL element OLED and a switch transistor Q4 and the source-drain voltage of the driver transistor Q1 are largely influenced, causing a failure to appropriately display images.

As such, in order that the operating point of the driver transistor Q1 is in the saturation region, a voltage drop margin for compensating for a voltage drop is added when setting the power source voltage to be supplied to the display.

In the same manner as the previously described power source circuit design and battery capacity, since the voltage drop margin for compensating for a voltage drop is set assuming the case where the voltage drop amount of the display becomes highest, unnecessary power is consumed for typical natural images.

In a small-sized display intended for mobile device use, the panel current is small and thus, compared to the voltage to be consumed by pixels, the voltage drop margin for compensating for a voltage drop is negligibly small.

However, when the current increases with the enlargement of panels, the voltage drop occurring in the power wire no longer becomes negligible.

Meanwhile, PTL 3 discloses a technique for an electronic display including a current-driven light-emitting unit, in which a voltage drop amount on a feeder wire is calculated from wire resistance of a power supply line and a pixel current and then from the voltage drop amount, the minimum required power source voltage is calculated, to regulate a power source voltage. Furthermore, the PTL 3 discloses a technique of coupling the calculated voltage drop amount to image signals provided from outside, thereby generating a voltage for determining luminance of the light-emitting unit, which is written into a capacitor. Through these techniques, the power consumption can be reduced and it becomes possible to reduce luminance variations in the electronic display disclosed in the PTL 3.

CITATION LIST

Patent Literature

[PTL 1] Japanese Unexamined Patent Application Publication 2006-65148

[PTL 2] International Publication No. 2009/011092

[PTL 3] Japanese Unexamined Patent Application Publication 2008-502015

SUMMARY OF INVENTION

Technical Problem

However, in the electronic display disclosed in the PTL 3, to calculate a voltage drop amount on the feeder wire from wire resistance of the power supply line and the pixel current, it usually requires enormous amount of calculation using the pixel current and a resistance wire network based on per-pixel wire resistance of the feeder wire, and moreover, it is necessary to provide a high capacity memory. The above-stated enormous calculation amount and providing a high capacity memory will increase the cost of the display device.

The present invention has been devised in view of the above-described problems and aims to provide a cost-reduced display device in which the calculation for a voltage drop amount on the feeder wire and the memory capacity are reduced, and to provide a method of driving such display device.

Solution to Problem

A display device according to an aspect of the present invention comprises: a display unit including a plurality of pixels arranged in rows and columns; a voltage source that supplies a power source voltage to the display unit; and a voltage regulating unit configured to regulate a voltage to be supplied to the display unit, according to video data indicating a luminance of each of the pixels, wherein the display unit further includes one or more power wires connected to the pixels and the voltage source and through which the power source voltage is supplied from the voltage source, the one or more power wires each including a pixel row resistance component that is a row-wise resistance component for each of the pixels and a pixel column resistance component that is a column-wise resistance component for each of the pixels, and the voltage regulating unit is configured to: divide the pixels into first blocks each made up of pixels in Xv rows and Xh columns (where Xv and Xh are integers of 2 or greater), and set the power wires to transfer the power source voltage for each of the first blocks; set a first block row resistance component to a value obtained by multiplying the pixel row resistance component by (Xh/Xv), and set a first block column resistance component to a value obtained by multiplying the pixel column resistance component by (Xv/Xh), the first block row resistance component being a row-wise resistance component of each of the power wires for each of the first blocks, the first block column resistance component being a column-wise resistance component of each of the power wires for each of the first blocks; and estimate a voltage drop amount distribution for the first blocks that is a distribution of amounts of voltage drop which occurs in the power wires when a current dependent on the video data flows through each of the first blocks, and regulate, based on the estimated voltage drop amount distribution, the voltage to be supplied to the display unit.

Advantageous Effects of Invention

In the display device and the method of driving the display device according to aspects of the present invention, the voltage drop amount on the feeder wire is calculated using wire resistance of the feeder wire approximated for each block including a plurality of pixels, which allows reductions in calculation processing load and in memory capacity, thus allowing a cost reduction. Furthermore, at least one of the regulation of the power source voltage and the correction of a signal voltage is performed using the calculated voltage drop amount, with the result that at least one of the reduction in power consumption and the reduction in luminance variations is achieved.

BRIEF DESCRIPTION OF DRAWINGS

FIG. 15 is a table indicating a voltage drop amount for each block, calculated when the pixels are roughly divided into blocks.

FIG. 17 is a table indicating a voltage drop amount for each block, calculated when the pixels are finely divided into blocks.

FIG. 22A is displayed.

FIG. 22C is displayed.

DESCRIPTION OF EMBODIMENTS (Underlying Knowledge Forming Basis of the Present Invention)

The inventors of the present invention found that the display device and the method of driving the display device, disclosed in the "Background Art" section, have the following problems.

When the current increases with the enlargement of panels, the voltage drop occurring in the power wire becomes no longer negligible.

Figure 21:
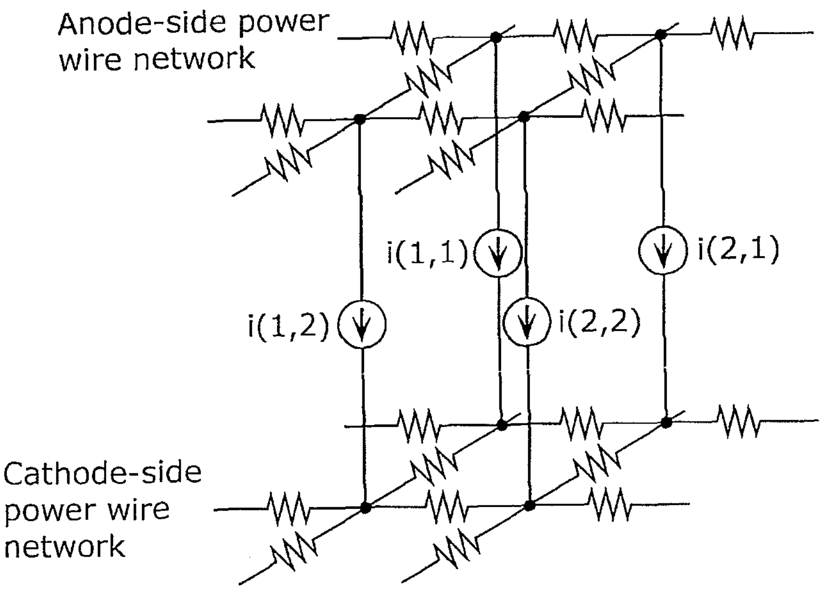
FIG. 21 schematically illustrates a configuration of an organic EL display obtained by modeling pixels to a current source.

FIG. 21 illustrates an organic EL display in which pixels are arranged in a matrix where each of the pixels is modeled to a current source in which a driver transistor flows a constant current according to video signals.

Furthermore, each of the pixels is connected to neighboring pixels through an anode-side power wire and a cathode-side power wire.

Figure 22A:
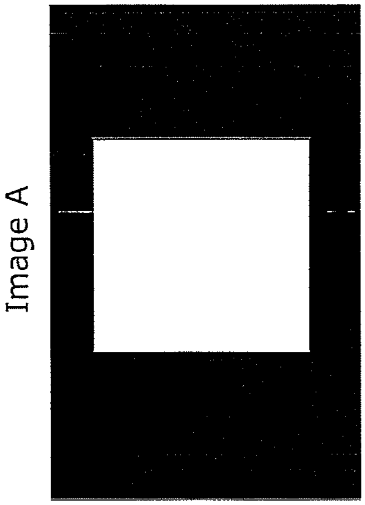
FIG. 22A illustrates an example of a displayed image.
Figure 22B:
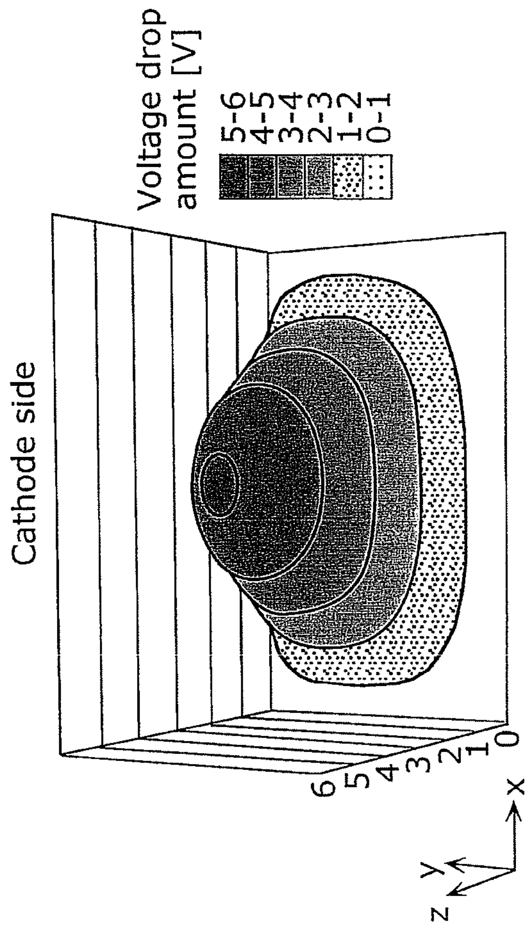
FIG. 22B is a graph illustrating a distribution of voltage drop values in cathode-side power supply lines of when
Figure 22C:
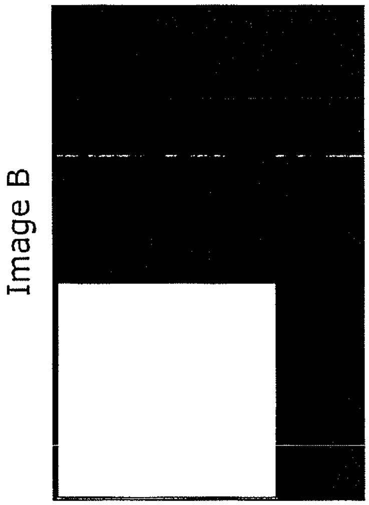
FIG. 22C illustrates another example of the displayed image.

FIGS. 22A and 22C each illustrate an example of a displayed image, showing white windows having the same size but displayed at different positions in black backgrounds.

Figure 22D:
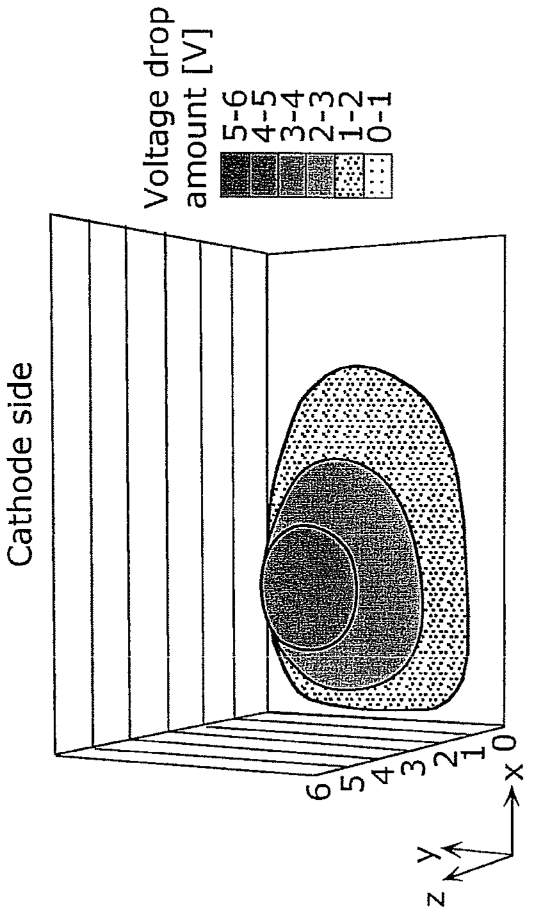
FIG. 22D is a graph illustrating a distribution of voltage drop values in cathode-side power supply lines of when

Furthermore, FIGS. 22B and 22D are graphs each illustrating a distribution of voltage drop values in cathode-side power supply lines of when these images are displayed on the organic EL display configured as shown in FIG. 21. Specifically, FIG. 22B is a graph illustrating a distribution of voltage drop values in cathode-side power supply lines of when FIG. 22A is displayed, and FIG. 22D is a graph illustrating a distribution of voltage drop values in cathode-side power supply lines of when FIG. 22C is displayed.

In the conventional technique proposed in the PTL 1, the same external voltage is set to be applied for an image A and an image B since the peak values of video signals for these images are the same.

However, as shown in FIGS. 22B and 22D, the voltage drop amount for the image B is approximately 2 V smaller than that for the image A, which means that the external voltage to be applied for the image B can be set to be at least 2V smaller than that for the image A, thereby reducing the power consumption.

By obtaining the distribution of voltage drop values in the power supply lines, it is possible to reduce the voltage drop margin in regulation of the power source voltage; in particular, it becomes possible to enhance the power consumption reducing effect in large display devices of 30 inches or more for home use. Furthermore, by obtaining the distribution of voltage drop amounts in the power supply lines, a reduction in the power consumption due to the regulation of the power source voltage is possible, and it also becomes possible to correct luminance variations in the display panel.

However, in the electronic display disclosed in the PTL 3, in order to calculate a voltage drop amount on the feeder wire from wire resistance of the power supply line and the pixel current, it usually requires enormous amount of calculation using the pixel current and a resistance wire network based on per-pixel wire resistance of the feeder wire. Furthermore, with an increase in the number of pixels as in a large display, the above amount of calculation increases exponentially.

In addition, the PTL 3 fails to disclose a specific calculation method for the voltage drop amount on the feeder wire, and in the case of calculating the above voltage drop amount using an assumed usual calculation method, it is necessary to provide a voltage drop amount calculating circuit with a high capacity memory. The above-stated increase in calculation amount and providing a high capacity memory will increase the cost of the display device.

In order to solve such problems, a display device according to an aspect of the present invention comprises: a display unit including a plurality of pixels arranged in rows and columns; a voltage source that supplies a power source voltage to the display unit; and a voltage regulating unit configured to regulate a voltage to be supplied to the display unit, according to video data indicating a luminance of each of the pixels, wherein the display unit further includes one or more power wires connected to the pixels and the voltage source and through which the power source voltage is supplied from the voltage source, the one or more power wires each including a pixel row resistance component that is a row-wise resistance component for each of the pixels and a pixel column resistance component that is a column-wise resistance component for each of the pixels, and the voltage regulating unit is configured to: divide the pixels into first blocks each made up of pixels in Xv rows and Xh columns (where Xv and Xh are integers of 2 or greater), and set the power wires to transfer the power source voltage for each of the first blocks; set a first block row resistance component to a value obtained by multiplying the pixel row resistance component by (Xh/Xv), and set a first block column resistance component to a value obtained by multiplying the pixel column resistance component by (Xv/Xh), the first block row resistance component being a row-wise resistance component of each of the power wires for each of the first blocks, the first block column resistance component being a column-wise resistance component of each of the power wires for each of the first blocks; and estimate a voltage drop amount distribution for the first blocks that is a distribution of amounts of voltage drop which occurs in the power wires when a current dependent on the video data flows through each of the first blocks, and regulate, based on the estimated voltage drop amount distribution, the voltage to be supplied to the display unit.

With this, a resistance wire network model is constructed in which a row-wise resistance component and a column-wise resistance components are set in the power wire per first block including a plurality of pixels, and using this resistance wire network model, a voltage distribution in the power wire is calculated for the respective blocks. Thus, compared to the case of calculating a voltage drop amount distribution for the respective pixels, the amount of calculation can be significantly reduced, the speed of calculation improves dramatically, and the memory capacity can be reduced, which allows a reduction in cost.

Furthermore, in the display device according to an aspect of the present invention, it is preferable that the voltage regulating unit be configured to set the Xv and the Xh with which the first block column resistance component and the first block row resistance component are equal.

With this, the voltage regulating unit is capable of performing the processing only using bit shift operation and addition/subtraction to calculate a voltage drop amount for each block, which almost excludes multiplication. This further allows a significant reduction in calculation time.

Furthermore, in the display device according to an aspect of the present invention, the voltage which is regulated by the voltage regulating unit may be the power source voltage.

With this, the power source voltage is regulated based on the voltage drop amount calculated using the resistance wire network model in which the pixels are divided into blocks, so that a high power consumption reducing effect can be achieved. Furthermore, heat generation is reduced because the power consumption can be reduced, which allows a light-emitting element included in the pixel to be less deteriorated.

Furthermore, in the display device according to an aspect of the present invention, the voltage which is regulated by the voltage regulating unit may be a signal voltage which results from conversion of the video data and is to be applied to each of the pixels.

With this, the signal voltage which is supplied to each of the pixels is corrected using the voltage drop amount calculated using the resistance wire network model in which the pixels are divided into blocks, so that the luminance variations in the display panel can be reduced.

Furthermore, in the display device according to an aspect of the present invention, it may be that the voltage which is regulated by the voltage regulating unit is the power source voltage and a signal voltage which results from conversion of the video data and is to be applied to each of the pixels.

With this, combining the power source voltage regulation based on the calculation of voltage drop distribution and the luminance variation correction based on the calculation of voltage drop distribution will produce both a power consumption reducing effect and a luminance variation reducing effect.

Furthermore, in the display device according to an aspect of the present invention, it may be that the voltage regulating unit is further configured to: divide the pixels into second blocks each made up of pixels in Yv rows and Yh columns (where Yv is an integer of 2 or greater which is different from Xv and Yh is an integer of 2 or greater which is different from Xh), and set the power wires to transfer the power source voltage for each of the second blocks; set a second block row resistance component to a value obtained by multiplying the pixel row resistance component by (Yh/Yv), and set a second block column resistance component to a value obtained by multiplying the pixel column resistance component by (Yv/Yh), the second block row resistance component being a row-wise resistance component of each of the power wires for each of the second blocks, the second block column resistance component being a column-wise resistance component of each of the power wires for each of the second blocks; estimate a voltage drop amount distribution for the second blocks that is a distribution of amounts of voltage drop which occurs in the power wires when a current dependent on the video data flows through each of the second blocks; and estimate a voltage drop amount distribution for the pixels from the voltage drop amount distribution estimated for the first blocks and the voltage drop amount distribution estimated for the second blocks.

With this, a small amount of calculation is enough to regulate the voltage with accuracy. As such, a further reduction in power consumption can be achieved at low cost.

Furthermore, in the display device according to an aspect of the present invention, the voltage regulating unit may be configured to regulate the voltage using a maximum value in the estimated voltage drop amount distribution for the first blocks.

With this, a luminance decrease in the pixel due to voltage shortage can be prevented.

Furthermore, in the display device according to an aspect of the present invention, it may be that the voltage source supplies a first voltage and a second voltage to the display unit, the second voltage being different from the first voltage, the one or more power wires include a first power wire through which the first voltage is supplied and a second power wire through which the second voltage is supplied, and the voltage regulating unit is configured to estimate a first distribution and a second distribution for the first blocks, and regulate the first voltage and the second voltage based on the first distribution and the second distribution, respectively, the first distribution being a distribution of amounts of voltage drop which occurs in the first power wire, the second distribution being a distribution of amounts of voltage drop which occurs in the second power wire.

Furthermore, in the display device according to an aspect of the present invention, the voltage regulating unit may be configured to regulate the first voltage and the second voltage according to a sum of a maximum value in the first distribution and a maximum value in the second distribution.

With this, even when the display device includes two power wires (the first power wire and the second power wire), the luminance decrease in the pixel due to voltage shortage can be prevented.

Furthermore, in the display device according to an aspect of the present invention, the voltage regulating unit may be configured to compute a total voltage drop amount distribution by adding up the first distribution and the second distribution for the respective first blocks, and regulate the first voltage and the second voltage based on the computed total voltage drop amount distribution, the total voltage drop amount distribution being a sum of the amounts of voltage drop which occurs in the first power wire and the amounts of voltage drop which occurs in the second power wire.

With this, the power consumption can further be reduced when the position inside the display unit at which the voltage drop amount in the first power wire is largest and the position inside the display unit at which the voltage drop amount in the second power wire is largest do not match.

Furthermore, in the display device according to an aspect of the present invention, the voltage regulating unit may be configured to regulate the first voltage and the second voltage using a maximum value in the total voltage drop amount distribution.

Furthermore, in the display device according to an aspect of the present invention, it may be that each of the pixels includes a driver and a light-emitting element, the driver includes a source electrode and a drain electrode, the light-emitting element includes a first electrode and a second electrode, the first electrode being connected to one of the source electrode and the drain electrode of the driver, and one of (i) the other of the source electrode and the drain electrode and (ii) the second electrode is connected to the first power wire, and the other of (i) the other of the source electrode and the drain electrode and (ii) the second electrode is connected to the second power wire.

Furthermore, in the display device according to an aspect of the present invention, it may be that the second electrode forms a part of a common electrode provided in common with the pixels, and the common electrode is electrically connected to the voltage source to allow a potential to be applied from a periphery of the common electrode.

Furthermore, in the display device according to an aspect of the present invention, it may be that the second electrode is formed of a transparent conductive material made of a metal oxide.

Furthermore, in the display device according to an aspect of the present invention, it may be that the light-emitting element is an organic electroluminescence (EL) element.

Furthermore, the present invention can be implemented not only as the above display device, but also as a method of driving the display device which includes, as steps, processing units of the display device.

It is to be noted that these general and specific aspects may be implemented using a system, a method, an integrated circuit, a computer program, or a computer-readable recording medium such as a compact disc read-only memory (CD-ROM), or any combination of systems, methods, integrated circuits, computer programs, or recording media.

Figure 8:
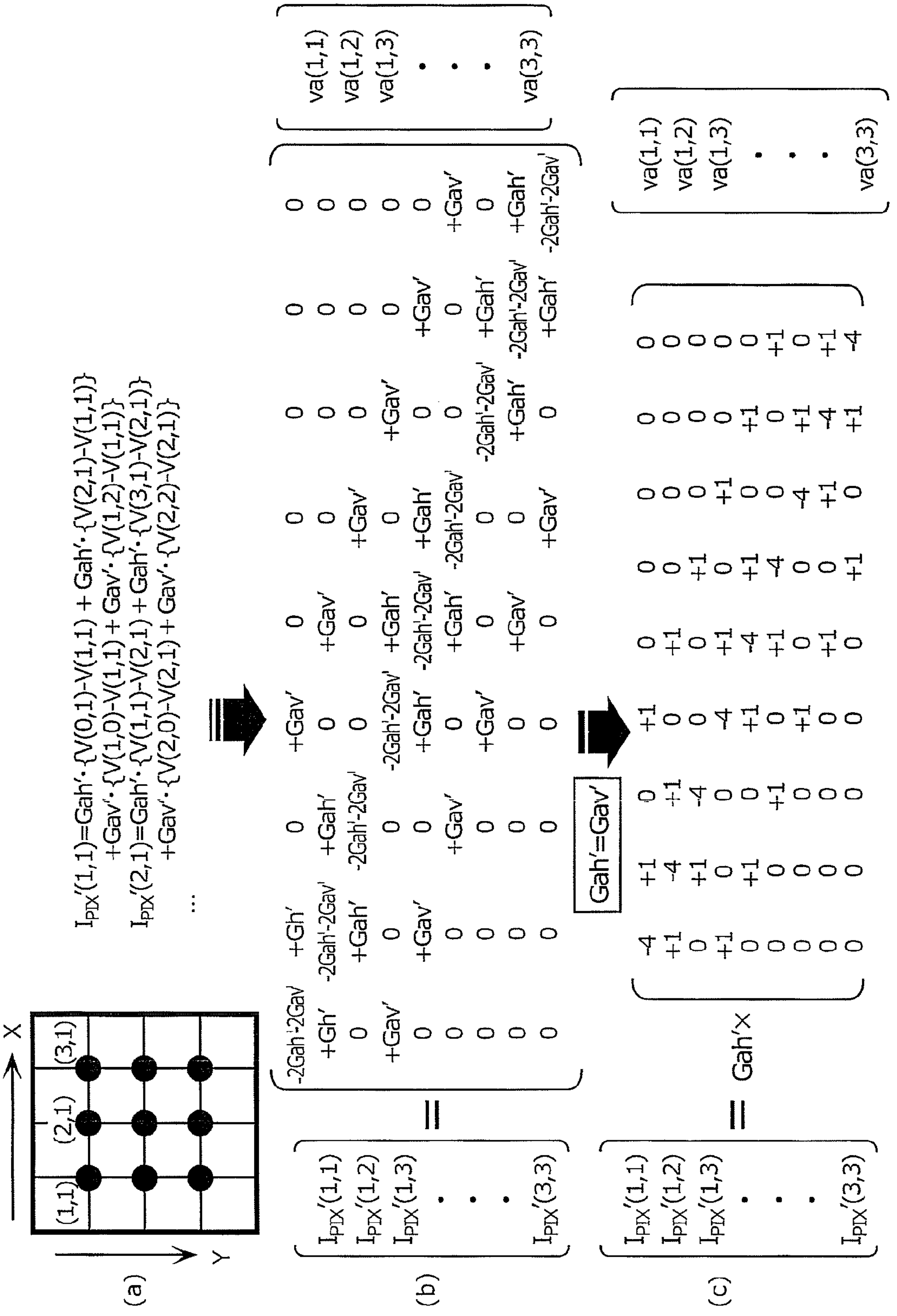
FIGS. 8(*a*), 8(*b*) and 8(*c*) are views for explaining an example of calculation for a voltage distribution using the resistance wire network model.

Furthermore, in the present invention, “row-wise/row direction” represents a direction in which pixel rows are arranged (the X-axis direction in (a) of FIG. 8) and “column-wise/column direction” represents a direction in which pixel columns are arranged (the Y-axis direction in (a) of FIG. 8).

Hereinafter, embodiments are specifically described with reference to the drawings.

Each of the embodiments described below shows a general or specific example. The numerical values, shapes, materials, structural elements, the arrangement and connection of the structural elements, steps, the order of the steps etc., shown in the following embodiments are examples and therefore do not limit the present invention. Among the structural elements in the following embodiments, structural elements not recited in any one of the independent claims indicating the broadest concept are described as arbitrary structural elements.

Embodiment 1

Figure 1:
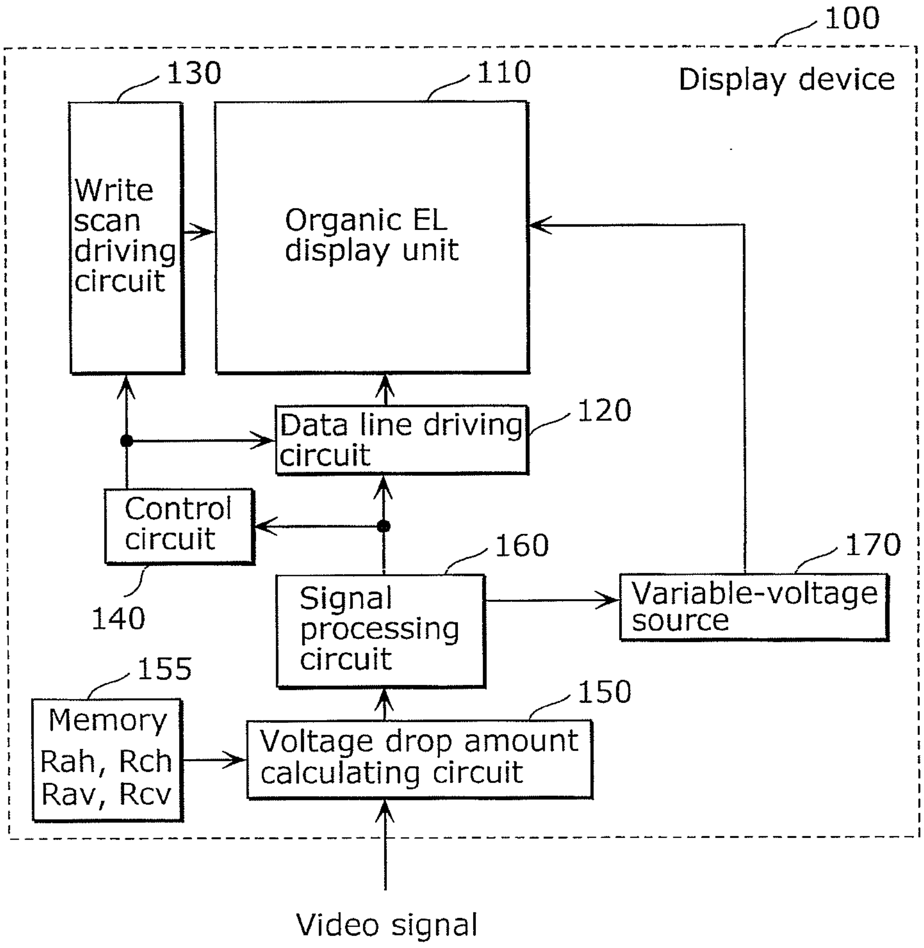
FIG. 1 is a block diagram illustrating a schematic configuration of a display device according to Embodiment 1.

FIG. 1 is a block diagram illustrating a schematic configuration of a display device according to Embodiment 1. A display device 100 illustrated in this figure includes an organic EL display unit 110, a data line driving circuit 120, a write scan driving circuit 130, a control circuit 140, a voltage drop amount calculating circuit 150, a memory 155, a signal processing circuit 160, and a variable-voltage source 170.

Figure 2:
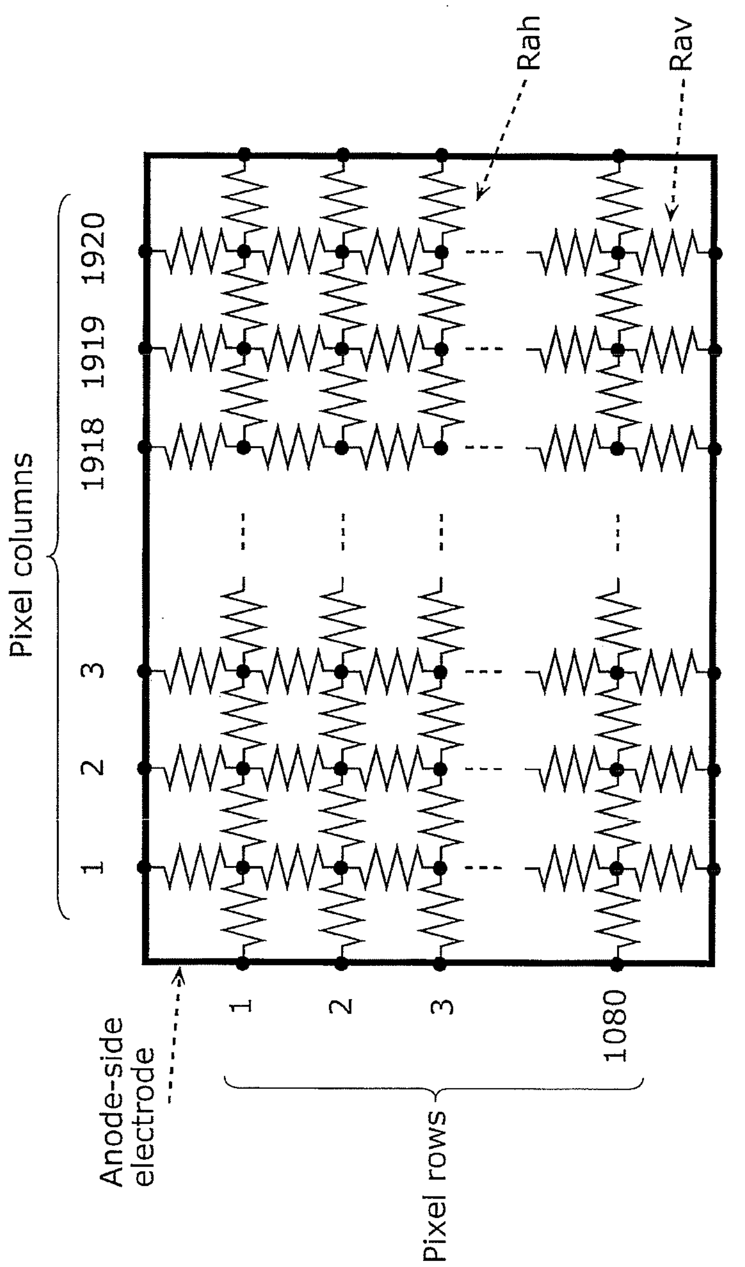
FIG. 2 schematically illustrates a model of an anode-side power wire network in an organic EL display unit which has 1920 pixel columns by 1080 pixel rows.

FIG. 2 schematically illustrates a model of an anode-side power wire network in an organic EL display unit which has 1920 pixel columns by 1080 pixel rows. The pixels are each connected to vertically and horizontally neighboring pixels through a row-wise resistance component Rah and a column-wise resistance component RaV, and have a periphery connected to an anode-side electrode to which an external voltage is applied.

Figure 3:
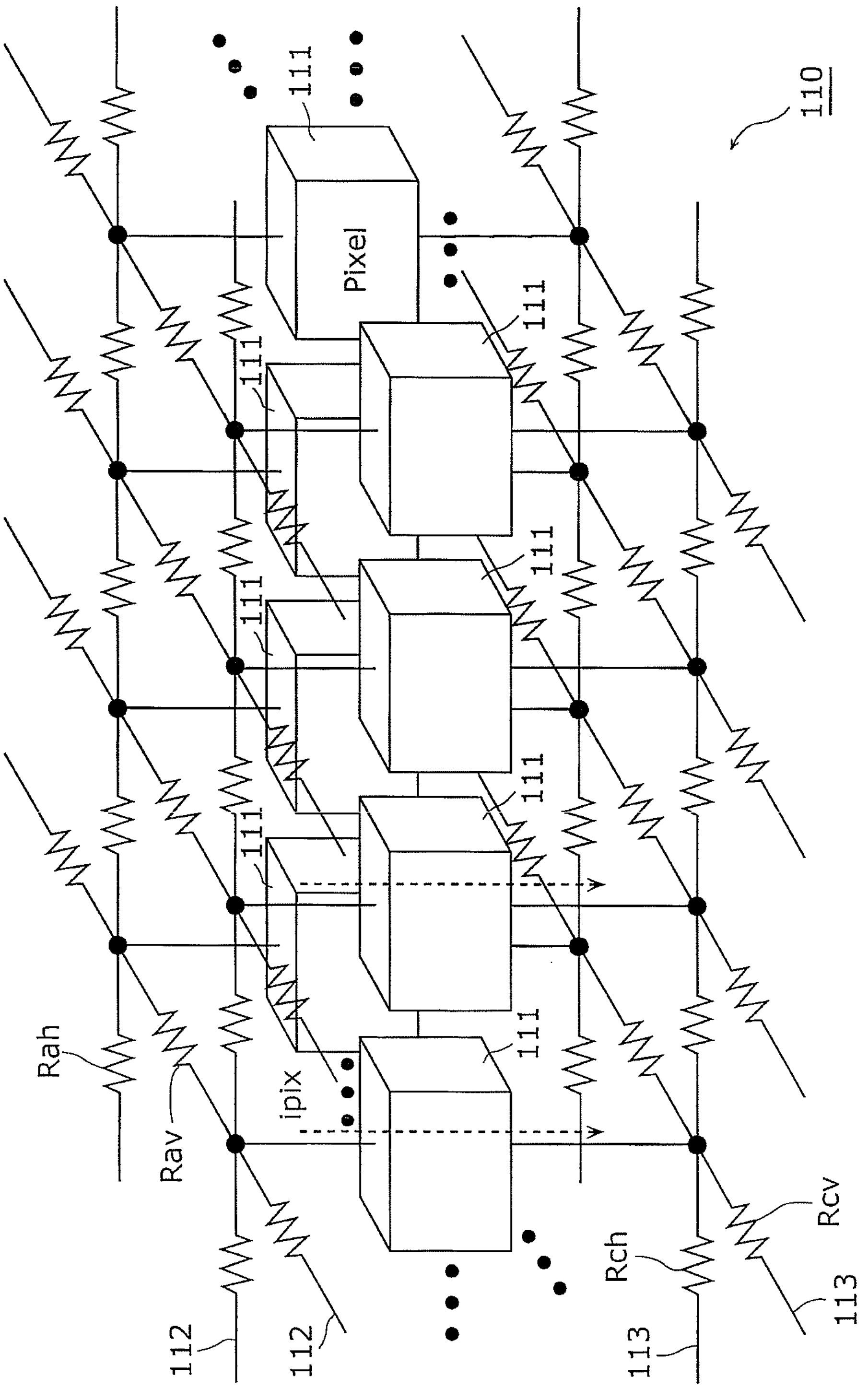
FIG. 3 is a perspective view schematically illustrating a configuration of an organic EL display unit according to Embodiment 1.

FIG. 3 is a perspective view schematically illustrating a configuration of the organic EL display unit according to Embodiment 1. It is to be noted that the lower side of this figure is the display screen side. As shown in the figure, the organic EL display unit 110 includes pixels 111 arranged in rows and columns, an anode-side power wire network 112, and a cathode-side power wire network 113.

The pixels 111 are connected to the anode-side power wire network 112 and the cathode-side power wire network 113 and each emit light according to pixel current ipix which flows through the corresponding pixel 111.

The anode-side power wire network 112 is formed in a mesh pattern, for example. On the other hand, the cathode-side power wire network 113 is formed into a solid-pattern film on the organic EL display unit 110, and the voltage which is output from the variable-voltage source 170 is applied from the periphery of the organic EL display unit 110. In FIG. 3, the anode-side power wire network 112 and the cathode-side power wire network 113 are schematically shown in mesh patterns in order to show the resistance components of the anode-side power wire network 112 and the cathode-side power wire network 113. It is to be noted that the cathode-side power wire network 113 is ground lines, for example, and may be grounded to a common ground potential of the display device 100 at the periphery of the organic EL display unit 110.

In the anode-side power wire network 112, there are a pixel row resistance component Rah that is a row-wise resistance component per pixel and a pixel column resistance component Rav that is a column-wise resistance component per pixel. Likewise, in the cathode-side power wire network 113, there are a pixel row resistance component Rch that is a row-wise resistance component per pixel and a pixel column resistance component Rcv that is a column-wise resistance component per pixel. It is to be noted that, although not illustrated, each of the pixels 111 is connected to the write scan driving circuit 130 and the data line driving circuit 120, and is also connected to a scanning line for controlling the timing at which the pixel 111 emits light and stops emitting light, and to a data line for supplying a signal voltage corresponding to the luminance of light emitted from the pixel 111.

Figure 4:
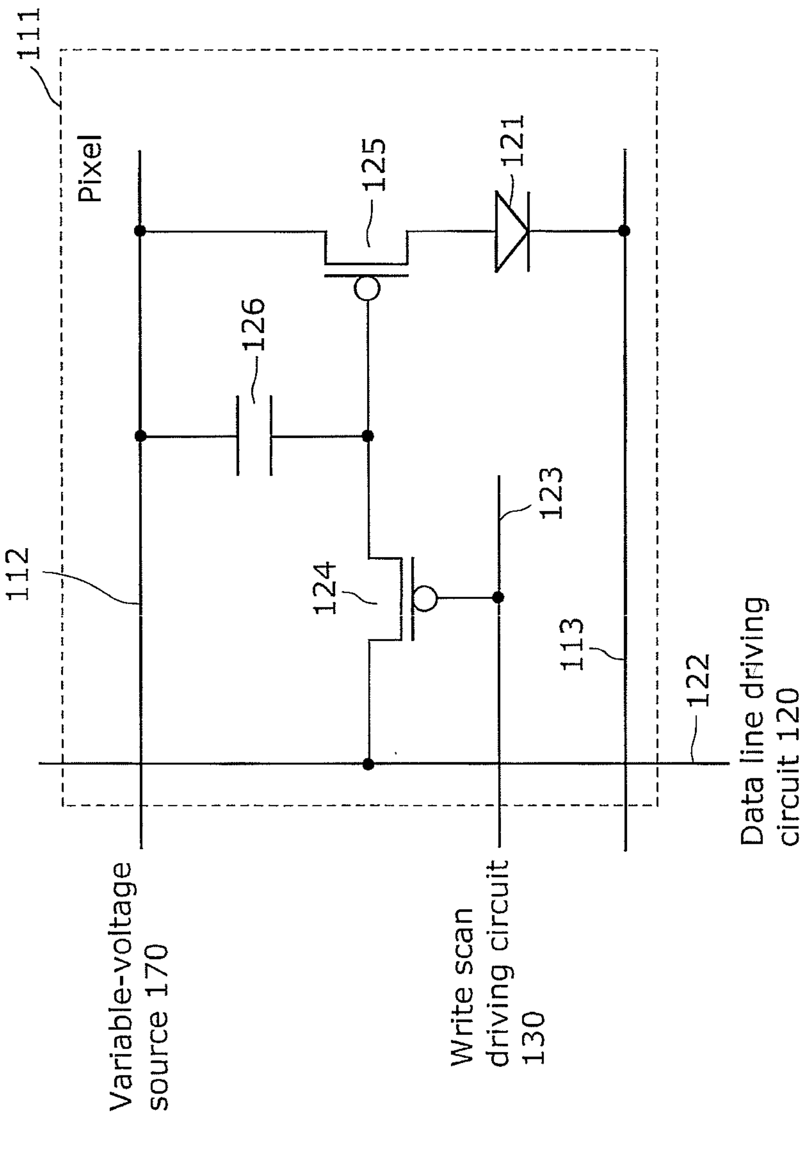
FIG. 4 is a circuit diagram illustrating an example of a specific configuration of a pixel according to Embodiment 1.

FIG. 4 is a circuit diagram illustrating an example of a specific configuration of the pixel according to Embodiment 1. The pixel 111 shown in this figure includes a driver and a light-emitting element. The driver includes a source electrode and a drain electrode. The light-emitting element includes a first electrode and a second electrode, and the first electrode is connected to one of the source electrode and the drain electrode of the driver. The high-side potential is applied to one of (i) the other of the source electrode and the drain electrode and (ii) the second electrode, and the low-side potential is applied to the other of (i) the other of the source electrode and the drain electrode and (ii) the second electrode. Specifically, each of the pixels 111 includes an organic EL element 121, a data line 122, a scanning line 123, a switch transistor 124, a driving transistor 125, and a capacitor 126. The pixels 111 are, for example, arranged in a matrix in the organic EL display unit 110.

The organic EL element 121 is an example of a light-emitting element, having an anode connected to the drain of the driving transistor 125 and a cathode connected to the cathode-side power wire network 113, and emits light with a luminance that is in accordance with a value of a current which flows between the anode and the cathode. The cathode-side electrode of the organic EL element 121 forms a part of a common electrode provided in common with the pixels 111. The common electrode is electrically connected to the variable-voltage source 170 so that potential is applied to the common electrode from the periphery thereof. Specifically, the common electrode functions as the cathode-side power wire network 113 in the organic EL display unit 110. Furthermore, the cathode-side electrode is formed of a transparent conductive material made of a metal oxide. It is to be noted that the anode-side electrode of the organic EL element 121 is an example of the first electrode, and the cathode-side electrode of the organic EL element 121 is an example of the second electrode. Furthermore, the cathode-side power wire network 113 is an example of the second power wire network.

The data line 122 is connected to the data line driving circuit 120 and one of the source and the drain of the switch transistor 124, and a signal voltage corresponding to a video signal (video data) is applied to the data line 122 by the data line driving circuit 120.

The scanning line 123 is connected to the write scan driving circuit 130 and the gate of the switch transistor 124, and turns the switching transistor 124 one and off according to a voltage applied by the write scan driving circuit 130.

The switching transistor 124 is a P-type thin-film transistor (TFT), for example, having a source and a drain one of which is connected to the data line 122 and the other of which is connected to the gate of the driving transistor 125 and one end of the capacitor 126.

The driving transistor 125 is an example of the driver and is a P-type TFT, for example, having a source connected to the anode-side power wire network 112, a drain connected to the anode of the organic EL element 121, and a gate connected to the one end of the capacitor 126 and the other of the source and the drain of the switching transistor 124. With this, the driving transistor 125 supplies the organic EL element 121 with a current that is in accordance with a voltage held in the capacitor 126. Here, the anode-side power wire network 112 is an example of the first power wire network.

The capacitor 126 has one end connected to the other of the source and the drain of the switch transistor 124, and the other end connected to the anode-side power wire network 112, and holds a potential difference between the potential of the anode-side power wire network 112 and the potential of the gate of the driving transistor 125 with the switch transistor 124 off. In other words, the capacitor 126 holds a voltage corresponding to the signal voltage.

The data line driving circuit 120 outputs a signal voltage corresponding to a video signal, to the pixel 111 via the data line 122.

The write scan driving circuit 130 outputs scanning signals to scanning lines 123 and thereby scans the pixels 111 sequentially. Specifically, the switch transistors 124 are switched on and off on a per row basis. With this, the signal voltages outputted to the data lines 122 are applied to the pixels 111 in the row selected by the write scan driving circuit 130. Therefore, the pixels 111 emit light with a luminance that is in accordance with a video signal.

The control circuit 140 gives an instruction on the drive timing to each of the data line driving circuit 120 and the write scan driving circuit 130.

The memory 155 is a storage unit in which the pixel row resistance component Rah and the pixel column resistance component Rav of the anode-side power wire network 112 and the pixel row resistance component Rch and the pixel column resistance component Rcv of the cathode-side power wire network 113, which are illustrated in FIGS. 2 and 3, are stored in advance.

The voltage drop amount calculating circuit 150 is a part of the voltage regulating unit and: divides the pixels into blocks based on the video signal received by the display device 100 and the pixel row resistance component Rah, the pixel column resistance component Rav, the pixel row resistance component Rch, and the pixel column resistance component Rcv which are read from the memory 155; sets the anode-side power wire network 112 and the cathode-side power wire network 113 to transfer the power source voltage for each of the blocks; estimates a voltage drop amount distribution for the respective blocks that is a distribution of amounts of voltage drop which occurs in the anode-side power wire network 112 and a distribution of amounts of voltage drop which occurs in the cathode-side power wire network 113, using a resistance wire network divided into the blocks; and outputs, to the signal processing circuit 160, a signal indicating a voltage margin corresponding to the estimated voltage drop amount distribution.

The signal processing circuit 160 is a part of the voltage regulating unit. According to a signal indicating a voltage margin, provided from the voltage drop amount calculating unit 150, the signal processing circuit 160 regulates an external voltage to be applied that is an anode-side voltage and a cathode-side voltage which the variable-voltage source 170 outputs. Specifically, the signal processing circuit 160 controls the variable-voltage source 170 so that the external voltage to be applied increases for the voltage margin.

The voltage drop amount calculating circuit 150 and the signal processing unit 160 regulate the power source voltage which is supplied to the organic EL display unit 110, according to video data indicating a luminance of each of the pixels.

The variable-voltage source 170 is an example of the voltage source that supplies a power source voltage to the organic EL display unit 110. Specifically, the variable-voltage source 170 supplies an anode-side voltage and a cathode-side voltage to the organic EL display unit 110. This variable-voltage source 170 is a power source of variable-voltage type that changes the external voltage to be applied (the anode-side voltage and the cathode-side voltage), according to the voltage indicated by the signal processing circuit 160.

As above, the display device 100 according to this embodiment estimates a voltage drop amount distribution for the respective blocks that is a distribution of amounts of voltage drop which occurs in the anode-side power wire network 112 due to received video signals, and a voltage drop amount distribution for the respective blocks that is a distribution of amounts of voltage drop which occurs in the cathode-side power wire network 113 due to the received video signals, and regulates the external voltage to be applied which is output from the variable-voltage source 170, based on the estimated voltage drop amount distribution for the respective blocks in the anode-side power wire network 112 and the estimated voltage drop amount distribution for the respective blocks in the cathode-side power wire network 113.

Next, the operation of the display device 100 according to the present invention is described with reference to FIGS. 5 to 8, 9A to 9C, and 10A to 10C.

In the control performed in a conventional display device, for example, a per-frame peak signal is extracted from the received video signals, and a voltage required to drive the driver and the organic EL element is set according to the peak signal to regulate the power source voltage, whereas, in the display device according to the present invention, not only the above video signals, but also the approximated resistance wire network model using the pixel row resistance components (Rah, Rch) and the pixel column resistance components (Rav, Rcv) of the power wire networks, stored in the memory 155 in advance, are used in the calculation to estimate the voltage drop amount.

Figure 5:
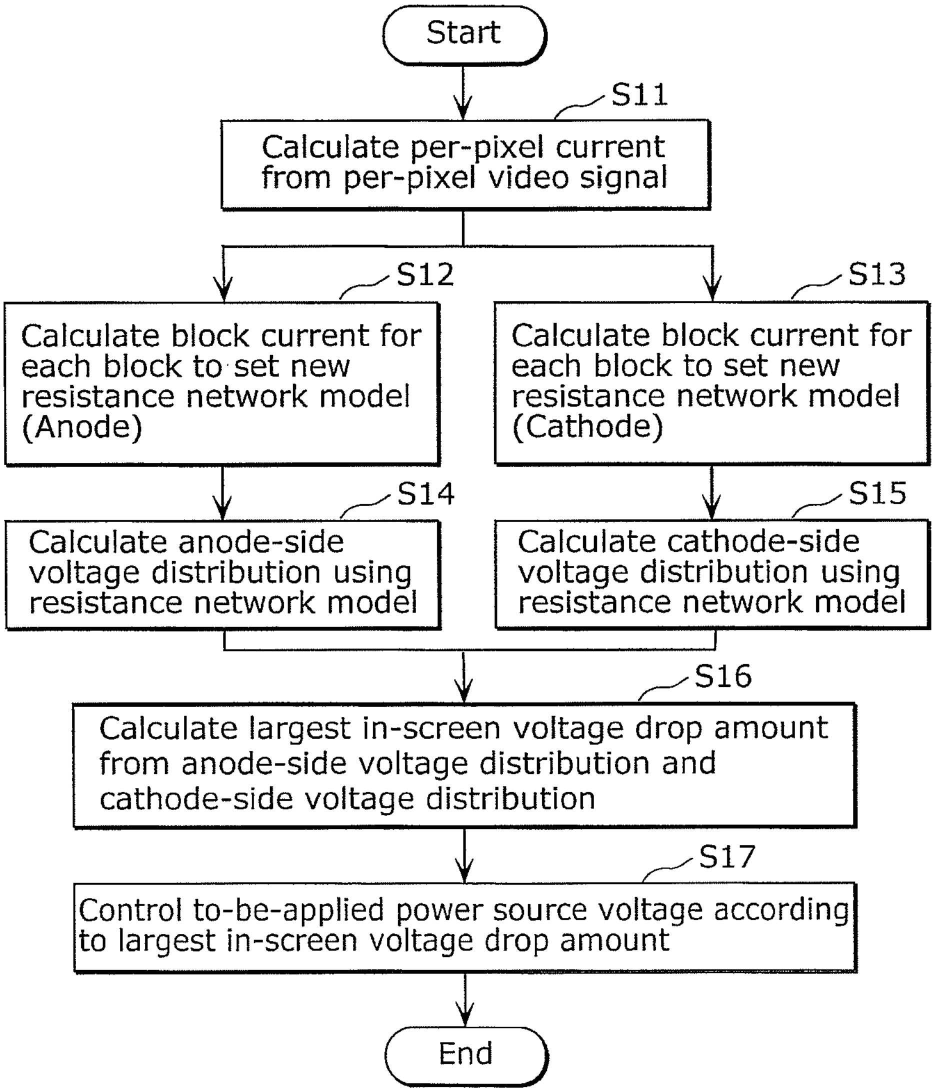
FIG. 5 is a flowchart illustrating a method of driving a display device according to Embodiment 1.

FIG. 5 is a flowchart illustrating a method of driving the display device according to Embodiment 1.

First, using a preset conversion expression or conversion table for video signals and pixel currents, the voltage drop amount calculating circuit 150 calculates, from the video signal, a current which flows through each pixel (Step S11). Specifically, the voltage drop amount calculating circuit 150 obtains one-frame-period video signals provided to the display device 100, and from the obtained video signals, calculates a pixel current which flows through each of the pixels 111. Here, the voltage drop amount calculating circuit 150 includes a conversion expression or conversion table which associates a video signal with a pixel current flowing through the pixels 11 which emit light with luminance corresponding to the video signal. Using this conversion expression or conversion table, the voltage drop amount calculating circuit 150 calculates a pixel current which flows through each of the pixels 111, from the one-frame-period video signals provided to the display device 100.

Next, the voltage drop amount calculating circuit 150 calculates a block current for each block including a plurality of pixels and sets a new resistance wire network model for the anode-side power wire network 112 (Step S12). Here, the above new resistance wire model is described.

Figure 6:
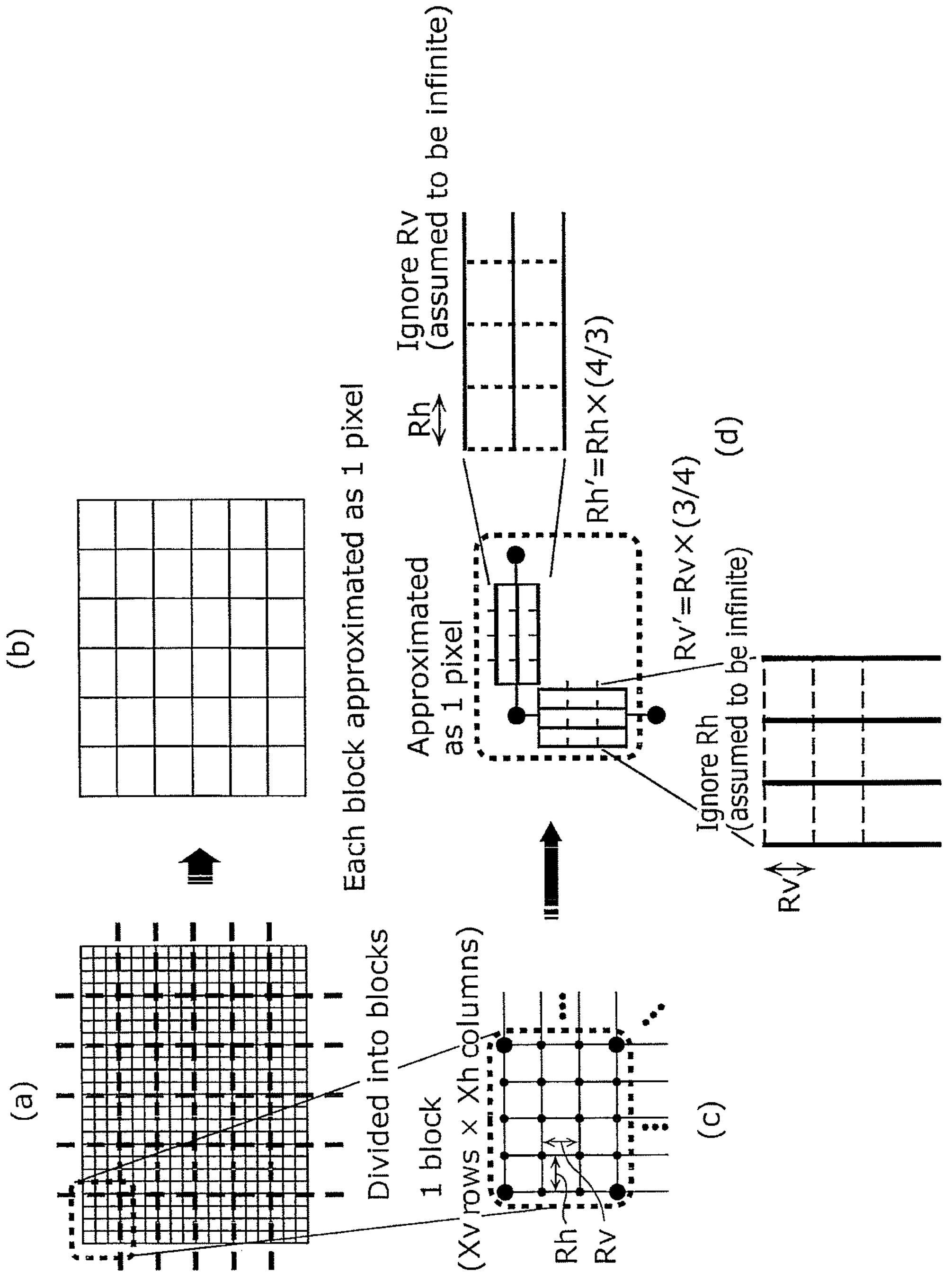
FIGS. 6(*a*), 6(*b*) and 6(*c*) are views for explaining a resistance wire network model which is set at the time of calculating a voltage drop amount.

FIG. 6 is a view for explaining a resistance wire network model which is set at the time of calculating a voltage drop amount. FIG. 6 shows, in (a), pixels in M rows by N columns arranged in a matrix divided into blocks each of which has pixels in Xv rows by Xh columns (e.g., 3 rows by 4 columns), and shows, in (b), such blocks in which a unit block is approximated as one pixel.

Here, as shown in (c) of FIG. 6, the power wire network for one block is formed of the resistance wire network which includes, per pixel, the resistance component Rh in the pixel row direction and the resistance component Rv in the pixel column direction. This is approximated as shown in (d) of FIG. 6, regarding the power wire network for one block as a new resistance wire network which includes, per block, a resistance component Rh' in the pixel row direction and a resistance component Rv' in the pixel column direction. Specifically, upon setting the pixel-row-wise resistance component Rh' per block, the resistance between the pixel rows inside one block is ignored, that is, the pixel-column-wise resistance component Rv is approximated as infinite. By doing so, when one block is made up of pixels in 3 rows by 4 columns shown in FIG. 6, for example, the resistance component Rh' can be approximated as combined resistance of three resistors connected in parallel each of which has four resistance components Rh connected in series, and thus is represented by Expression 1.

$$Rh' = Rh \times (Xh/Xv) = Rh \times (4/3) \quad \text{(Expression 1)}$$

Furthermore, upon setting the pixel-column-wise resistance component Rv' per block, the resistance between the pixel columns inside one block is ignored, that is, the pixel-column-wise resistance component Rh is approximated as infinite. By doing so, when one block is made up of pixels in 3 rows by 4 columns shown in FIG. 6, for example, the resistance component Rv' can be approximated as combined resistance of four resistors connected in parallel each of which has three resistance components Rv connected in series, and thus is represented by Expression 2.

$$Rv' = Rv \times (Xv/Xh) = Rv \times (3/4) \quad \text{(Expression 2)}$$

The above approximation is based on the fact that even ignoring a part of the resistance components included in the resistance wire network barely affects calculation accuracy because increasing the definition will lead to a reduction in potential difference in the feeder wire between individual pixels.

The following describes a specific setting flow for the resistance wire network model in which the pixels are divided into blocks.

Figure 7:
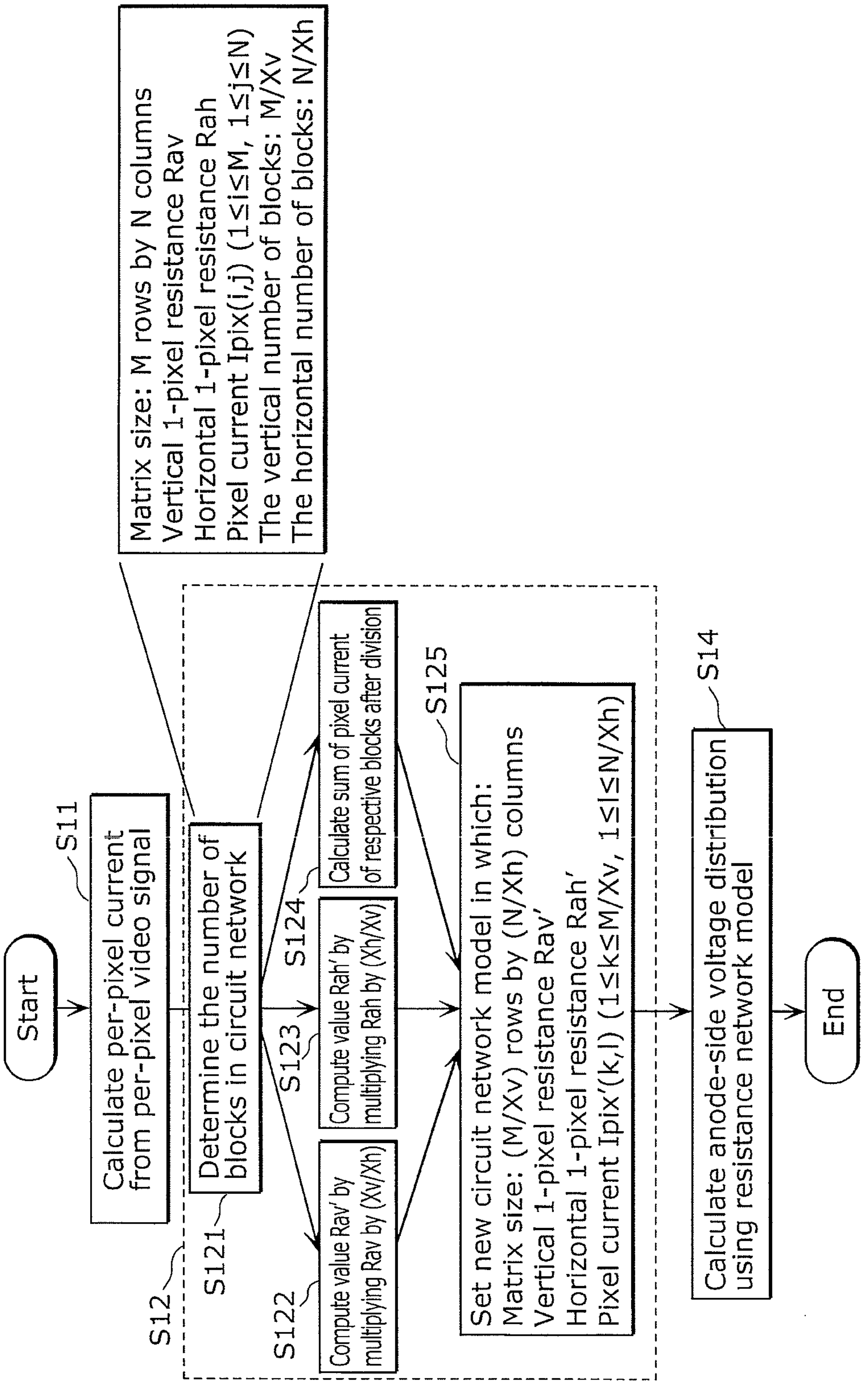
FIG. 7 is a flowchart illustrating an algorithm for creating a resistance wire network model in which the pixels are divided into blocks.

FIG. 7 is a flowchart illustrating an algorithm for creating the resistance wire network model in which the pixels are divided into blocks.

First, the voltage drop amount calculating circuit 150 determines the number of blocks in the resistance wire network model (S121). Specifically, for example, assume that the matrix size of the display panel is M rows by N columns, the number of pixel rows in one block is Xv, and the number of pixel columns in one block is Xh, then the number of blocks in the pixel column direction is M/Xv, and the number of blocks in the pixel row direction is N/Xh.

Step S121 corresponds to the step of dividing the pixels 111 into first blocks each made up of pixels 111 in Xv rows by Xh columns (where Xv and Xh are integers of 2 or greater) and setting the anode-side power wire network 112 to supply the power source voltage to each of the first blocks.

Next, the voltage drop amount calculating circuit 150 calculates a block column resistance component Rav' that is a pixel-column-wise resistance component in one block, by multiplying the pixel column resistance component Rv of the anode-side power wire network 112 by (Xv/Xh) (S122). Furthermore, the voltage drop amount calculating circuit 150 calculates a block row resistance component Rah' that is a pixel-row-wise resistance component in one block, by multiplying the pixel row resistance component Rh of the anode-side power wire network 112 by (Xh/Xv) (S123).

Steps S122 and S123 correspond to the step of setting a first block row resistance component that is a row-wise resistance component of the anode-side power wire network 112 for each of the first blocks, to a value obtained by multiplying the pixel row resistance component by (Xh/Xv), and setting a first block column resistance component that is a column-wise resistance component of the anode-side power wire network 112 for each of the first blocks, to a value obtained by multiplying the pixel column resistance component by (Xv/Xh).

Furthermore, the voltage drop amount calculating circuit 150 calculates a block current for each of the blocks (S124). Specifically, when the pixel current for a pixel (i, j) is denoted by Ipix(i, j), a block current Ipix'(k, l) ($1 \le k \le M/Xv$, $1 \le l \le N/Xh$) in the k-th row and the l-th column is a sum of pixel currents which flow through (Xv by Xh) pixels belonging to the block in the k-th row and the l-th column.

At the end, the voltage drop amount calculating circuit 150 sets, as a new resistance wire network model in which one block is assumed to be one pixel, the matrix size of (M/Xv) rows by (N/Xh) columns, the pixel-column-wise resistance component Rav' for one block in the anode-side power wire network 112, the pixel-row-wise resistance component Rah' for one block in the anode-side power wire network 112, and the block current Ipix'(k, l) (S125).

Here, the description continues with reference back to the flowchart shown in FIG. 5.

Next, the voltage drop amount calculating circuit 150 calculates a voltage distribution in the anode-side power wire network 112 using the resistance wire network model set in Step S12 (Step S14).

FIG. 8 is a view for explaining an example of calculation for the voltage distribution using the resistance wire network model. This figure shows a specific example of calculation for voltage drop amounts in the anode-side power wire network 112 using the resistance wire network model in which the display panel is divided into nine blocks. Specifically, when, in a block (k, l) that is a block located in the k-th row and l-th column, the voltage drop amount is denoted by va(k, l) and the block current is denoted by Ipix'(k, l) in the anode-side power wire network 112, the following Expression 3 is derived for the block current Ipix'(k, l) in the block (k, l).

$$Ipix'(k,l) = Gah' \times \{va(k-1,l) - va(k,l)\} + Gah' \times \{va(k+1,l) - va(k,l)\} + Gav' \times \{va(k,l-1) - va(k,l)\} + Gav' \times \{va(k,l+1) - va(k,l)\} \quad \text{(Expression 3)}$$

In the above Expression 3, Gah' and Gav' denote a block row admittance component and a block column admittance component, respectively, of the anode-side power wire network 112, and are the reciprocal of the block row resistance component Rah' and the reciprocal of the block column resistance component Rav', respectively, of the anode-side power wire network 112. Here, va(k, l) denotes a voltage drop amount in the block (k, l) in the anode-side power wire network 112. Furthermore, k and I are both integers of 0 to 4. In addition, va(0, l), va(4, l), va(k, 0), and va(k, 4) each denote an amount of voltage drop which occurs in a wire from the variable-voltage source 170 to the organic EL display unit 110 and are so small as to be approximated as zero.

FIG. 8 shows, in (a), expressions for block currents Ipix'(1, 1) in block (1, 1) and Ipix'(2, 1) in block (2, 1) based on Expression 3. FIG. 8 shows, in (b), a determinant based on the above expressions for Ipix'(1, 1) to Ipix'(3, 3). Here, since Ipix'(1, 1) to Ipix'(3, 3) are known values calculated in Step S124 and Gah' and Gav' are values defined by Expressions 1 and 2, it is possible to determine solutions for variables va(1, 1) to va(3, 3) represented by nine simple simultaneous equations. In other words, the voltage distribution in the anode-side power wire network 112 is calculated for the respective blocks.

To calculate a voltage drop amount va(k, l) of each block using the above determinant, the Gauss-Jordan method is used, for example. In this case, for example, compared to the case of calculating a voltage drop amount of each pixel in a panel having a resolution of 1920 columns by 1080 rows, the calculation amount can be approximately 1,680,000 times less when the voltage drop amount is calculated for each block in 40 by 40 blocks (the size of one block=48 pixels×27 pixels) using the above-described resistance wire network in which the pixels are divided into the blocks.

Furthermore, the number of blocks in the resistance wire network model is determined in Step S121 to make Rav'=Rah' (Gav'=Gah') as in the determinant shown in (c) of FIG. 8, with the result that the 9 by 9 matrix contains 1 and −4 coefficients only. This allows the voltage drop amount calculating circuit 150 to calculate va(1, 1) to va(3, 3) using bit shift operation and addition/subtraction only, which almost excludes multiplication (requiring only multiplication of Gah' at the end). As a result, the calculation time can further be reduced significantly.

Figure 9A:
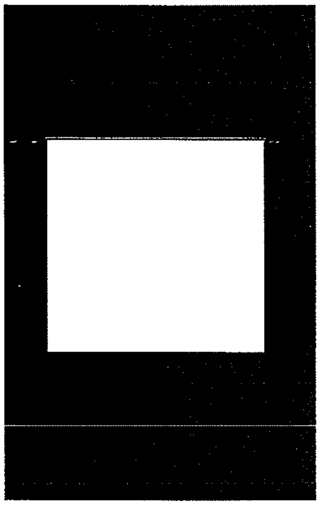
FIG. 9A schematically illustrates an example of an image displayed on an organic EL display unit.

FIG. 9A schematically illustrates an example of an image displayed on the organic EL display unit 110. In an image A shown in this figure, the central part is white and the other part than the central part is black in the organic EL display unit 110.

Figure 9B:
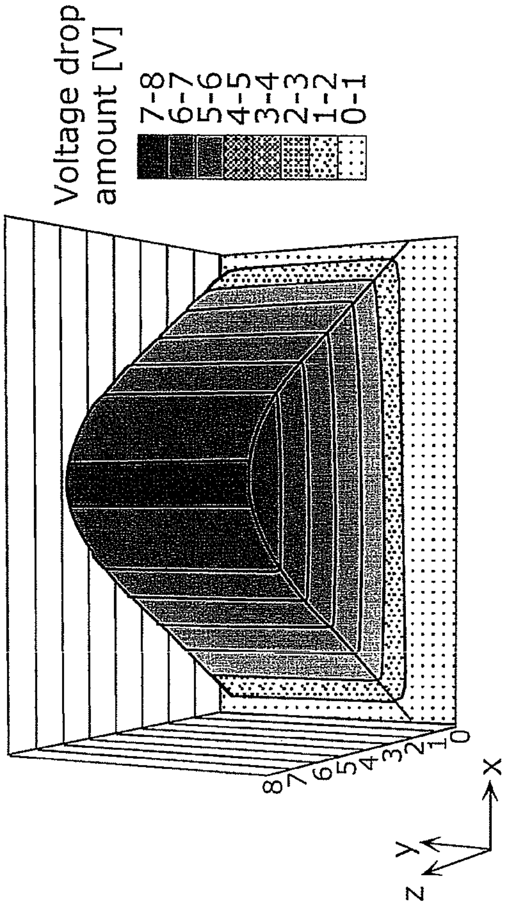
FIG. 9B is a graph illustrating a voltage distribution in the anode-side power wire network calculated from video signals indicating the image of FIG. 9A.

FIG. 9B is a graph illustrating a voltage distribution in the anode-side power wire network 112 calculated from video signals indicating the image A. In this figure, the X axis represents row-wise block coordinates set in Step S12, the Y axis represents column-wise block coordinates set in Step S12, and the Z axis represents voltage drop amounts calculated in Step S14. Specifically, pixel coordinates (0, l) correspond to the X axis, and pixel coordinates (k, 0) correspond to the Y axis.

As described above, when the video signals indicating the image A are received, the voltage drop amount calculating circuit 150 calculates, from the video signals, a current which flows through each of the pixels (Step S11), calculates a block current for each of the blocks obtained by dividing the pixels, to set a new resistance wire network model for the anode-side power wire network 112 (Step S12), and calculates, using such resistance wire network model, a voltage distribution in the anode-side power wire network 112 that is the first distribution (Step S14).

Here, it is assumed that the anode-side power wire network 112 is a one-dimensional wire in which the pixel column resistance components Rav shown in FIGS. 2 and 3 are substantially infinite. In other words, a plurality of anode-side power wire networks 112 provided for different rows of the pixels 111 are arranged in parallel to the pixel row direction. With this, the voltage drop amount in the anode-side power wire network 112 in the rows corresponding to the white region in the image A gradually increases toward the center of the screen. On the other hand, the voltage drop amount in the anode-side power wire network 112 in a row other than the rows corresponding to the white region in the image A is substantially zero.

As in the above case of calculating a voltage drop amount using the resistance wire network model in the anode-side power wire network 112, the voltage drop amount calculating circuit 150 calculates a block current for each block including a plurality of pixels and sets a new resistance wire network model for the cathode-side power wire network 113 after Step S11 (Step S13).

Next, the voltage drop amount calculating circuit 150 calculates, using the resistance wire network model set in Step S13, a voltage distribution in the cathode-side power wire network 113 that is the second distribution (Step S15). Specifically, in block coordinates (k, l), establishing and solving simultaneous equations for the cathode-side power wire network 113 as in the above Expression 3 make it possible to obtain a voltage drop (increase) amount vc(k, l) in the cathode-side power wire network 113 at the block coordinates (k, l). In other words, it is possible to calculate a voltage distribution in the cathode-side power wire network 113 for each of the blocks.

Figure 9C:
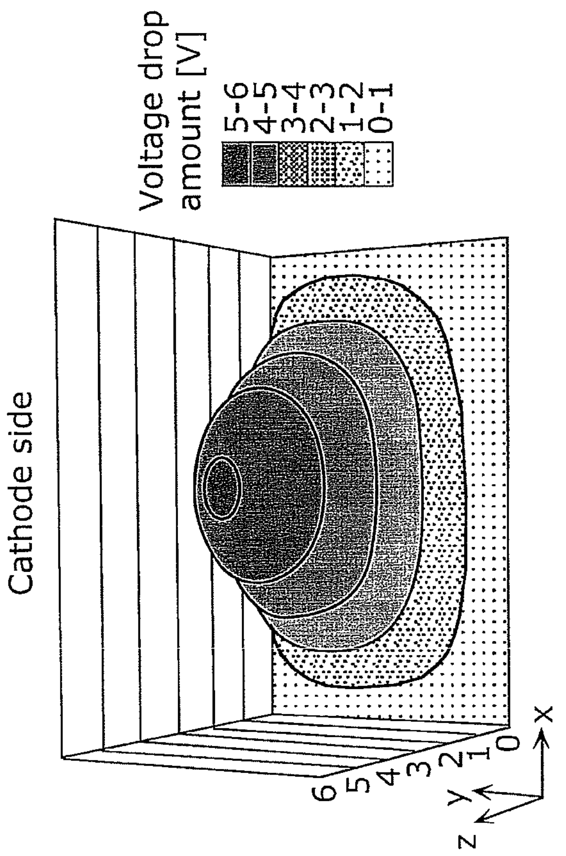
FIG. 9C is a graph illustrating a voltage distribution of a cathode-side power wire network calculated from the video signals indicating the image of FIG. 9A.

FIG. 9C is a graph illustrating a voltage distribution in the cathode-side power wire network 113 calculated from the video signals indicating the image A. In this figure, the X axis represents row-wise block coordinates set in Step S13, the Y axis represents column-wise block coordinates set in Step S13, and the Z axis represents voltage drop amounts calculated in Step S15.

As in the case of calculating a voltage drop amount in the anode-side power wire network 112, the voltage drop amount calculating circuit 150 calculates a voltage drop (increase) amount in the cathode-side power wire network 113. Here, the cathode-side power wire network 113 is formed into a solid-pattern film. Thus, the voltage drop (increase) amount vc(k, l) in the cathode-side power wire network 113 is largest in the center of the organic EL display unit 110. It is to be noted that the process (Step S14) of calculating a voltage distribution in the anode-side power wire network 112 and the process (Step S15) of calculating a voltage distribution in the cathode-side power wire network 113 are each an example of the step of estimating.

Although, in the above Steps S12 and S13, the anode-side block row resistance component Rah', the anode-side block column resistance component Rav', the cathode-side block row resistance component Rch', and the cathode-side block column resistance component Rcv' are calculated respectively from the anode-side pixel row resistance component Rah, the anode-side pixel column resistance component Rav, the cathode-side pixel row resistance component Rch, and the cathode-side pixel column resistance component Rcv which are read from the memory 155, it may be possible that, when the number of blocks is determined beforehand, numerical data, calculated based on the above resistance wire network model, of the anode-side block row resistance component Rah', the anode-side block column resistance component Rav', the cathode-side block row resistance component Rch', and the cathode-side block column resistance component Rcv', is stored in the memory 155 in advance.

Here, the description continues with reference back to the flowchart shown in FIG. 5.

Next, the voltage drop amount calculating circuit 150 calculates a maximum in-screen voltage drop value vmax at which the sum |va(k, l)|+|vc(k, l)| of the voltage drop amount va(k, l) in the anode-side power wire network 112 and the voltage drop (increase) amount vc(k, l) in the cathode-side power wire network 113 is largest among the blocks (Step S16). In other words, the voltage drop amount calculating circuit 150 adds up, for the respective block coordinates (k, l), the distribution of voltage drop amounts in the anode-side power wire network 112 and the distribution of voltage drop (increase) amounts in the cathode-side power wire network 113, thereby calculating a total voltage drop amount distribution that is the sum of the distribution of voltage drop amounts in the anode-side power wire network 112 and the distribution of voltage drop (increase) amounts in the cathode-side power wire network 113. Subsequently, the calculated total voltage drop amount distribution is used to calculate the maximum in-screen voltage drop value vmax.

It is to be noted that, as compared to the maximum in-screen voltage drop value vmax calculated in Step S16, the sum |vamax|+|vcmax| of the maximum value vamax of voltage drop amounts va(k, l) and the maximum value vcmax of voltage drop (increase) amounts vc(k, l) satisfies the relationship vmax≤|vamax|+|vcmax|.

Thus, it is also possible to use |vamax|+|vcmax| as the maximum in-screen voltage drop value for the purpose of reducing the operation amount.

In this case, there is a possibility of estimating the voltage drop amount to be too large, which means that, although the power consumption reducing effect is reduced as compared to the method in Step S16, the voltage drop amount will not be estimated to be too small, which causes no harm to displayed images.

Next, a voltage distribution in the anode-side power wire network 112 and a voltage distribution in the cathode-side power wire network 113 obtained in the case where the display device 100 receives video signals different from the video signals indicating the image A are described.

Figure 10A:
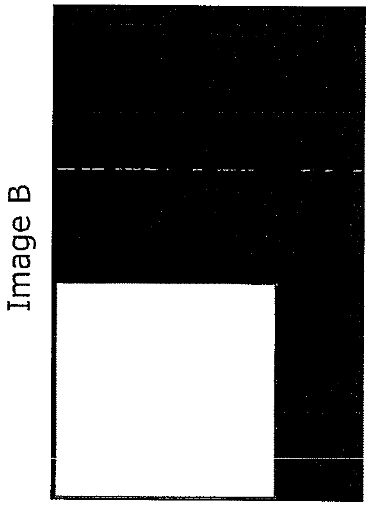
FIG. 10A schematically illustrates another example of the image displayed on the organic EL display unit.

FIG. 10A schematically illustrates another example of the image displayed on the organic EL display unit. The image B illustrated in this figure includes a white region which has the same size as the white region in the image A shown in FIG. 9A and is displayed at a position different from the position of the white region in the image A. Specifically, in the image B, a region including block coordinates (1, 1) is the white region.

Figure 10B:
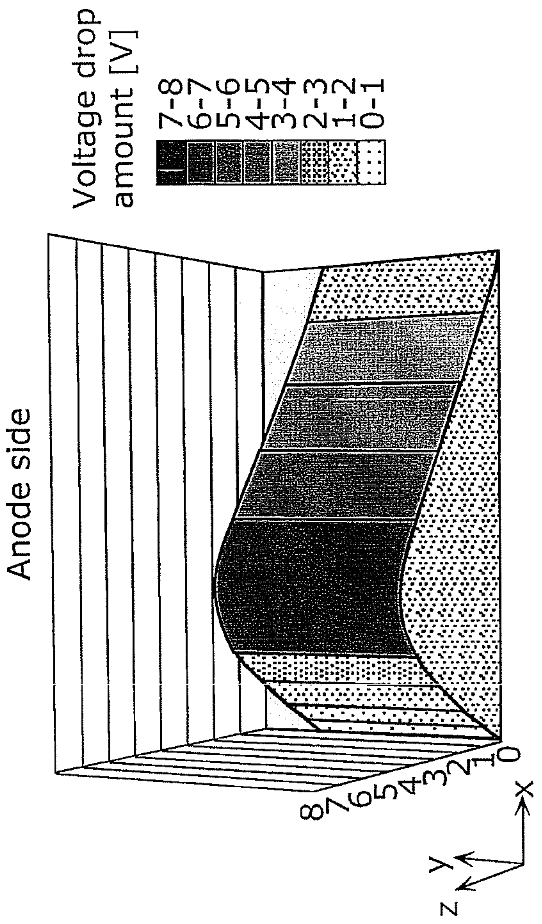
FIG. 10B is a graph illustrating a voltage distribution in the anode-side power wire network calculated from video signals indicating the image of FIG. 10A.

FIG. 10B is a graph illustrating a voltage distribution in the anode-side power wire network 112 calculated from video signals indicating the image B. In this figure, the X axis represents row-wise pixel coordinates set in Step S12, the Y axis represents column-wise pixel coordinates set in Step S12, and the Z axis represents voltage drop amounts calculated in Step S14.

In the voltage distribution in the anode-side power wire network 112 shown in this figure, the peak in the distribution is on the left side (closer to block coordinates (k, 0)) and the peak voltage is lower, as compared to the voltage distribution in the anode-side power wire network 112 shown in FIG. 9B. Specifically, the maximum value in the voltage distribution in the anode-side power wire network 112 shown in FIG. 9B is 7 to 8 V whereas the maximum value in the voltage distribution in the anode-side power wire network 112 shown in FIG. 10B is 4 to 5 V, which is approximately 3 V lower.

Figure 10C:
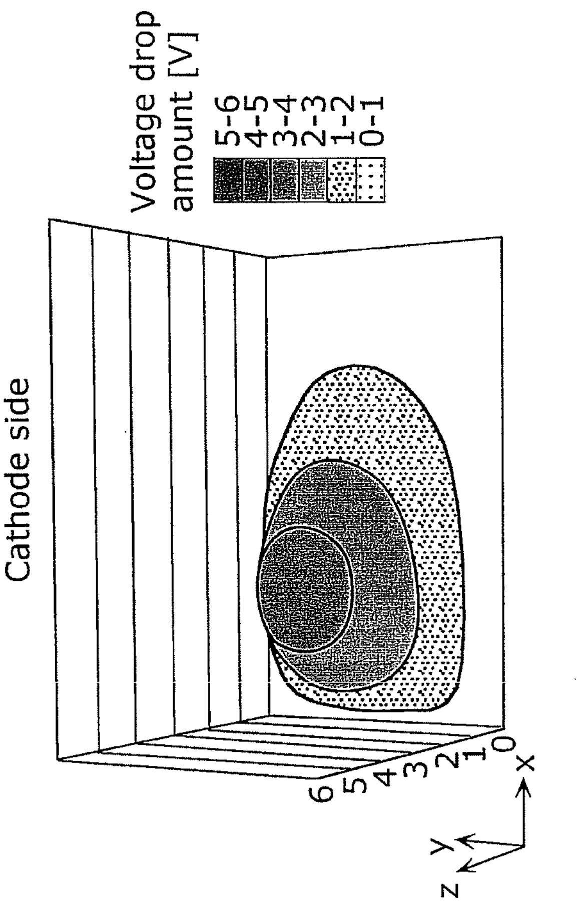
FIG. 10C is a graph illustrating a voltage distribution of a cathode-side power wire network calculated from the video signals indicating the image of FIG. 10A.

FIG. 10C is a graph illustrating a voltage distribution in the cathode-side power wire network 113 calculated from the video signals indicating the image B. In this figure, the X axis represents row-wise pixel coordinates set in Step S13, the Y axis represents column-wise pixel coordinates set in Step S13, and the Z axis represents voltage drop amounts calculated in Step S15.

In the voltage distribution in the cathode-side power wire network 113 shown in this figure, as in FIG. 10B, the peak in the distribution is on the left side and the peak voltage is lower, as compared to the voltage distribution in the cathode-side power wire network 113 shown in FIG. 9C. Specifically, the maximum value in the voltage distribution in the cathode-side power wire network 113 shown in FIG. 9C is 5 to 6 V whereas the maximum value in the voltage distribution in the cathode-side power wire network 113 shown in FIG. 10C is 3 to 4 V, which is approximately 2 V lower.

Thus, the maximum voltage drop value vmax for the image A illustrated in FIG. 9A is 12 to 14 V, and the maximum voltage drop value vmax for the image B illustrated in FIG. 10A is 7 to 9 V. In other words, different images lead to different maximum voltage drop values vmax calculated in the process (Step S16) of calculating the largest voltage drop amount from the voltage distribution in the anode-side power wire network 112 and the voltage distribution in the cathode-side power wire network 113. In particular, the image A and the image B include the white regions of the same size, but have different maximum voltage drop values vmax since the white regions are displayed at different positions.

Here, the description continues with reference back to the flowchart shown in FIG. 5.

Next, the signal processing circuit 160 controls an external voltage to be applied, which is output by the variable-voltage source 170, according to the maximum voltage drop value vmax calculated by the voltage drop amount calculating circuit 150 (Step S17). Specifically, the voltage drop amount calculating circuit 150 outputs, to the signal processing circuit 160, a signal indicating the calculated maximum voltage drop value vmax. The signal processing circuit 160 calculates a voltage margin of the external voltage to be applied, which is output from the variable-voltage source 170, from the received signal indicating the maximum voltage drop value vmax. This voltage margin is, for example, equivalent to the maximum voltage drop value vmax calculated by the voltage drop amount calculating circuit 150. Accordingly, the variable-voltage source 170 supplies the organic EL display unit 110 with a voltage obtained by addition of the voltage margin.

In other words, this maximum voltage drop value vmax is used as the voltage margin which compensates for voltage drop to increase a voltage which is supplied from the variable-voltage source 170 to the organic EL display unit 110, allowing a reduction in power consumption by setting, according to video, the minimum necessary external voltage to be applied.

Specifically, when the video signals indicating the image A are received, the voltage margin is set to 12 to 14 V, and when the video signals indicating the image B are received, the voltage margin is set to 7 to 9 V. To put it differently, for the image A and the image B, different external voltages to be applied are supplied even when the peak values of the video signals are the same. In other words, when the image B is received, the voltage to be supplied to the anode-side power wire network 112 can be lower, that is, the power consumption can be lower, than that when the image A is received.

It is to be noted that the process of calculating the largest in-screen voltage drop amount (Step S16) and the process of controlling a voltage to be applied (Step S17) are an example of the step of regulating.

Furthermore, when video signals are received, the voltage drop amount calculating circuit 150 calculates a voltage drop amount for each of the blocks and uses a result of the calculation to calculate voltage distributions in the power wire networks in the above Steps S14 and S15, but such calculation is not limited to the per-frame calculation. For example, the calculation of voltage drop amounts in Steps S14 and S15 may be performed every time video data in more than one pixel row is updated.

An implementation in which the above processing is performed for each frame produces an advantage of enough processing time while an implementation in which the above processing is performed for each set of pixel rows requires high-speed processing, but produces an advantage of improved setting accuracy of a power source voltage.

As above, the display device 100 according to this embodiment includes: the organic EL display unit 110 including the plurality of pixels 111 arranged in rows and columns; the variable-voltage source 170 that supplies a power source voltage to the organic EL display unit 110; and the voltage drop amount calculating circuit 150 and the signal processing circuit 160 that regulate the voltage to be supplied to the organic EL display unit 110, according to video data indicating a luminance of each of the pixels 111, and the organic EL display unit 110 further includes the anode-side power wire network 112 and the cathode-side power wire network 113, and the anode-side power wire network 112 includes the pixel row resistance component Rah that is a row-wise resistance component for each of the pixels and the pixel column resistance component Rav that is a column-wise resistance component for each of the pixels, and the cathode-side power wire network 113 includes the pixel row resistance component Rch that is a row-wise resistance component for each of the pixels and the pixel column resistance component Rcv that is a column-wise resistance component for each of the pixels. The voltage drop amount calculating circuit 150 divides the pixels 111 into first blocks each made up of pixels in Xv rows and Xh columns (where Xv and Xh are integers of 2 or greater), sets the anode-side power wire network 112 and the cathode-side power wire network 113 to transfer the power source voltage for each of the first blocks, sets a first block row resistance component that is a row-wise resistance component of each of the anode-side power wire network 112 and the cathode-side power wire network 113 for each of the first blocks, to a value obtained by multiplying the pixel row resistance component by (Xh/Xv), and sets a first block column resistance component that is a column-wise resistance component of each of the anode-side power wire network 112 and the cathode-side power wire network 113 for each of the first blocks, to a value obtained by multiplying the pixel column resistance component by (Xv/Xh). The voltage drop amount calculating circuit 150 then estimates a voltage drop amount distribution for the respective blocks that is a distribution of amounts of voltage drop which occurs in each of the anode-side power wire network 112 and the cathode-side power wire network 113 when a current dependent on the video data flows through each of the first blocks. The signal processing circuit 160 regulates, based on the voltage drop amount distribution estimated by the voltage drop amount calculating circuit 150, the voltage to be supplied to the organic EL display unit 110.

Thus, when the resistance wire network model is constructed in which a pixel-column-wise resistance component and a pixel-row-wise resistance component are set in the power wire for each block including a plurality of pixels, and using this resistance wire network model, a voltage distribution for the respective blocks is calculated, the amount of calculation can be significantly reduced, and the memory capacity can be reduced, as compared to the case of calculating a voltage drop amount distribution for the respective pixels. This allows a reduction in cost. In addition, it is further possible to significantly reduce calculation time by determining the number of blocks in the resistance wire network model so that the pixel-column-wise resistance component and the pixel-row-wise resistance component become equal.

Furthermore, since the power source voltage is regulated based on the voltage drop amount calculated using the resistance wire model in which the pixels are divided into blocks, a high power consumption reducing effect can be achieved. For example, in the case of two video signals whose peaks are the same, but are at different positions inside the organic EL display unit, voltages obtained by addition of different voltage margins are supplied to the organic EL display unit 110. Consequently, the power consumption can further be reduced as compared to a conventional structure in which the voltage margin is determined according to the peak of the video signal.

Furthermore, the display device 100 according to this embodiment is capable of reducing the power consumption and thereby capable of reducing heat generation, which allows the light-emitting element 121 to be less deteriorated.

Furthermore, the display device 100 according to this embodiment calculates the maximum in-screen voltage drop value vmax among the pixels 111, from the total voltage drop amount distribution calculated by the voltage drop amount calculating circuit 150, and regulates, using the calculated maximum value vmax of total voltage drop amounts, the external voltage to be applied. With this, a luminance decrease in the pixel 111 due to voltage shortage can be prevented.

Embodiment 2

In this embodiment, a display device which reduces luminance variations by correcting the signal voltage to be supplied to each of the pixels, using the voltage drop amounts calculated using the resistance wire network model in which the pixels are divided into blocks, described in Embodiment 1, is described as well as a method of driving the display device.

Figure 11:
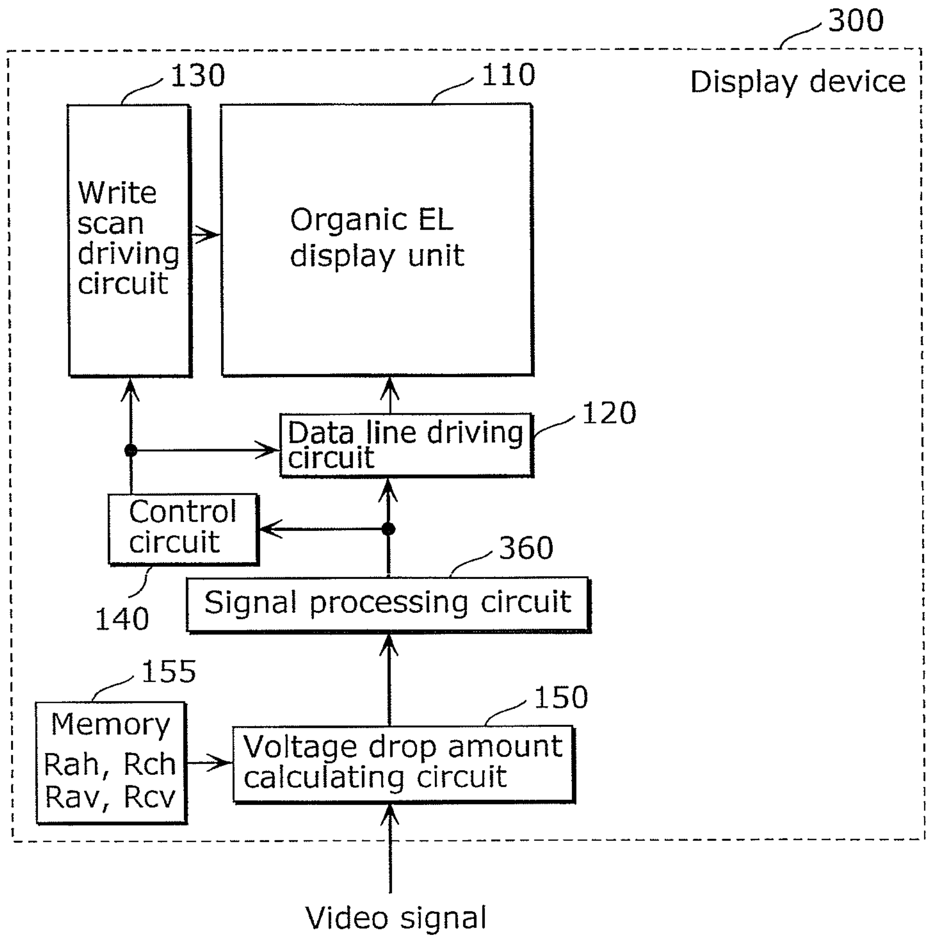
FIG. 11 is a block diagram illustrating a schematic configuration of a display device according to Embodiment 2.

FIG. 11 is a block diagram illustrating a schematic configuration of a display device according to Embodiment 2. A display device 300 illustrated in this figure includes the organic EL display unit 110, the data line driving circuit 120, the write scan driving circuit 130, the control circuit 140, the voltage drop amount calculating circuit 150, the memory 155, and a signal processing circuit 360.

The display device 300 according to this embodiment is different from the display device 100 according to Embodiment 1 in the function of the signal processing circuit and in that the variable-voltage source is deleted. This means that the display device 300 reflects the voltage drop amount calculated by the voltage drop amount calculating circuit 150 using the resistance wire network model, not in the adjustment of the power source voltage, but in the video signal, and corrects a signal voltage to be written to each pixel. The following describes only differences from the display device 100 according to Embodiment 1 to avoid repetition.

The voltage drop amount calculating circuit 150 is an example of the voltage regulating unit and: divides the pixels into blocks based on the video signal received by the display device 300 and the pixel row resistance component Rah, the pixel column resistance component Rav, the pixel row resistance component Rch, and the pixel column resistance component Rcv which are read from the memory 155; sets the anode-side power wire network 112 and the cathode-side power wire network 113 to transfer the power source voltage for each of the blocks; estimates a voltage drop amount distribution for the respective blocks that is a distribution of amounts of voltage drop which occurs in the anode-side power wire network 112 and a distribution of amounts of voltage drop which occurs in the cathode-side power wire network 113, using a resistance wire network divided into the blocks; and outputs the estimated voltage drop amounts to the signal processing circuit 160.

The signal processing circuit 360 uses the voltage drop amount provided by the voltage drop amount calculating circuit 150 and the original video signal to generate a new video signal which reflects the voltage drop amount, and outputs the new video signal to the data line driving circuit.

The data line driving circuit 120 outputs a signal voltage corresponding to the new video signal generated by the signal processing circuit 360, to the pixel 111 through the data line 122.

Next, the operation of the display device 300 according to the present invention is described with reference to FIG. 12.

Figure 12:
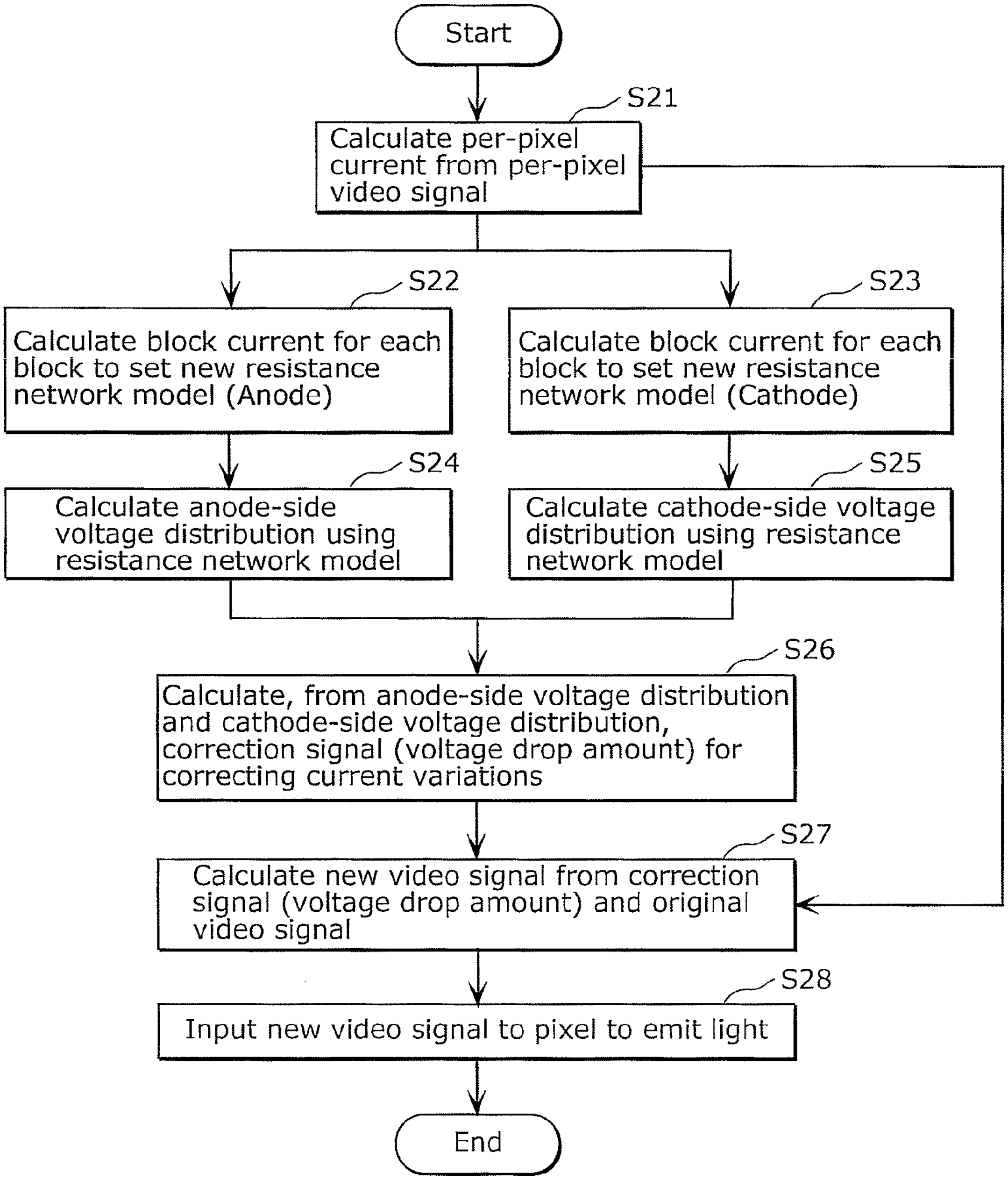
FIG. 12 is a flowchart illustrating a method of driving a display device according to Embodiment 2.

FIG. 12 is a flowchart illustrating a method of driving the display device according to Embodiment 2. The operations performed in Steps S21 to S25 shown in this figure are the same or alike, respectively, as the operations in Steps S11 to S15 shown in FIG. 5, and therefore are not described here.

Next, the voltage drop amount calculating circuit 150 calculates a correction signal for correcting luminance variations in the display panel from the voltage drop amount va(k, l) in the anode-side power wire network 112 and the voltage drop (increase) amount vc(k, l) in the cathode-side power wire network 113 (Step S26). As an example, v(k, l) is calculated which is a simple sum $|va(k, l)|+|vc(k, l)|$ of the voltage drop amount va(k, l) in the anode-side power wire network 112 and the voltage drop (increase) amount vc(k, l) in the cathode-side power wire network 113 in each block. In other words, the voltage drop amount calculating circuit 150 adds up, for the respective block coordinates (k, l), the distribution of voltage drop amounts in the anode-side power wire network 112 and the distribution of voltage drop (increase) amounts in the cathode-side power wire network 113, thereby calculating a total voltage drop amount distribution that is the sum of the distribution of voltage drop amounts in the anode-side power wire network 112 and the distribution of voltage drop (increase) amounts in the cathode-side power wire network 113, which results in the correction signal.

Alternatively, as another example, the sum may be a weighted sum obtained by weighting one or both of the voltage drop amounts, that is, the voltage drop amount va(k, l) in the anode-side power wire network 112 and the voltage drop (increase) amount vc(k, l) in the cathode-side power wire network 113 in each block. In this case, v'(k, l) is calculated which is $|va(k, l)|+\alpha\times|vc(k, l)|$. Here, $\alpha$ is a coefficient which defines a weight for the voltage drop (increase) amount vc(k, l) in the cathode-side power wire network 113 relative to the voltage drop amount va(k, l) in the anode-side power wire network 112. In other words, the voltage drop amount calculating circuit 150 adds up, for the respective block coordinates (k, l), the distribution of voltage drop amounts in the anode-side power wire network 112 and the distribution of voltage drop (increase) amounts in the cathode-side power wire network 113 multiplied by a certain constant ratio $\alpha$, thereby calculating a voltage drop amount distribution that is a weighted sum of the distribution of voltage drop amounts in the anode-side power wire network 112 and the distribution of voltage drop (increase) amounts in the cathode-side power wire network 113, which results in the correction signal. For the sake of the following explanation on the driving operation, assume that when the voltage drop amount calculated in this step is denoted by v(k, l), a voltage drop amount v(k1, l1) in a block (k1, l1) is 2 V.

Next, the signal processing circuit 360 calculates a new video signal from the correction signal (the voltage drop amount) calculated in Step S26 and the original video signal (Step S27). For example, assume that the signal voltage at pixel (M1, N1) obtained by conversion based on the original video signal is 8 V and the pixel (M1, N1) is included in the block (k1, l1), the signal processing circuit 360 corrects the signal voltage at the pixel (M1, N1) to obtain 10 V (=the signal voltage obtained by conversion based on the original video signal (8 V)+v(k1, l1)(2 V)). In other words, the signal processing circuit 360 uses the original video signal and the voltage drop amount v(k, l) in a block to correct the signal voltage at a pixel included in the block.

At the end, the data line driving circuit 120 supplies each pixel with the signal voltage determined based on the new video signal and thereby causes each pixel to emit light (Step S28).

As above, the display device 300 according to this embodiment includes: the organic EL display unit 110 including the plurality of pixels 111 arranged in rows and columns; and the voltage drop amount calculating circuit 150 and the signal processing circuit 360 that regulate the voltage to be supplied to the organic EL display unit 110, according to video data indicating a luminance of each of the pixels 111, and the organic EL display unit 110 further includes the anode-side power wire network 112 and the cathode-side power wire network 113, and the anode-side power wire network 112 includes the pixel row resistance component Rah that is a row-wise resistance component for each of the pixels and the pixel column resistance component Rav that is a column-wise resistance component for each of the pixels, and the cathode-side power wire network 113 includes the pixel row resistance component Rch that is a row-wise resistance component for each of the pixels and the pixel column resistance component Rev that is a column-wise resistance component for each of the pixels. The voltage drop amount calculating circuit 150 divides the pixels 111 into first blocks each made up of pixels in Xv rows and Xh columns (where Xv and Xh are integers of 2 or greater), sets the anode-side power wire network 112 and the cathode-side power wire network 113 to transfer a power source voltage for each of the first blocks, sets a first block row resistance component that is a row-wise resistance component of each of the anode-side power wire network 112 and the cathode-side power wire network 113 for each of the first blocks, to a value obtained by multiplying the pixel row resistance component by (Xh/Xv), and sets a first block column resistance component that is a column-wise resistance component of each of the anode-side power wire network 112 and the cathode-side power wire network 113 for each of the first blocks, to a value obtained by multiplying the pixel column resistance component by (Xv/Xh). The voltage drop amount calculating circuit 150 then estimates a voltage drop amount distribution for the respective first blocks that is a distribution of amounts of voltage drop which occurs in each of the anode-side power wire network 112 and the cathode-side power wire network 113 when a current dependent on the video data flows through each of the first blocks. The signal processing circuit 360 regulates, based on the voltage drop amount distribution estimated by the voltage drop amount calculating circuit 150, the signal voltage which results from conversion of the video data and is to be applied to each of the pixels.

Thus, when the resistance wire network model is constructed in which a pixel-column-wise resistance component and a pixel-row-wise resistance component are set in the power wire for each block including a plurality of pixels, and using this resistance wire network model, a voltage distribution for the respective blocks is calculated, the amount of calculation can be significantly reduced, and the memory capacity can be reduced, as compared to the case of calculating a voltage drop amount distribution for the respective pixels. This allows a reduction in cost. In addition, it is further possible to significantly reduce calculation time by determining the number of blocks in the resistance wire network model so that the pixel-column-wise resistance component and the pixel-row-wise resistance component become equal.

Furthermore, since the signal voltage to be supplied to each pixel is corrected based on the voltage drop amount calculated using the resistance wire model in which the pixels are divided into blocks, the luminance variations in the display panel can be reduced.

Embodiment 3

Embodiments 1 and 2 of the present invention show that when a video-dependent voltage drop amount is calculated using a newly-set block-based resistance wire network, it is possible to (1) reduce the power consumption by setting the minimum necessary external voltage to be applied and (2) reduce the luminance variations by correcting the video signal. As the block decreases in size, a more accurate voltage drop amount can be obtained. On the other hand, the smaller the block in size, the more the calculation because the simple simultaneous equations having determinants illustrated in (b) of FIG. 8 need to be solved on each of the anode side and the cathode side.

In view of the above problem, this embodiment describes a system which allows lesser calculation and more accurate calculation of the voltage drop amount at the same time.

Specifically, in this embodiment, the voltage regulating unit divides the pixels into first blocks each made up of pixels in Xv rows by Xh columns (where Xv and Xh are integers of 2 or greater). The voltage regulating unit then sets the anode-side power wire network 112 and the cathode-side power wire network 113 to supply the power source voltage for each of the first blocks, sets a first block row resistance component Rah1' that is a row-wise resistance component corresponding to the first block in the anode-side power wire network 112, to a value obtained by multiplying a row-wise resistance component Rah corresponding to a pixel in the anode-side power wire network 112 by (Xh/Xv), and sets a first block column resistance component Rav1' that is a column-wise resistance component corresponding to the first block in the anode-side power wire network 112, to a value obtained by multiplying a column-wise resistance component Rav corresponding to a pixel in the anode-side power wire network 112 by (Xv/Xh). Furthermore, the voltage regulating unit sets a first block row resistance component Rch1' that is a row-wise resistance component corresponding to the first block in the cathode-side power wire network 113, to a value obtained by multiplying a row-wise resistance component Rch corresponding to a pixel in the cathode-side power wire network 113 by (Xh/Xv), and sets a first block column resistance component Rcv1' that is a column-wise resistance component corresponding to the first block in the cathode-side power wire network 113, to a value obtained by multiplying a column-wise resistance component Rcv corresponding to a pixel in the cathode-side power wire network 113 by (Xv/Xh). With this, the voltage regulating unit estimates a voltage drop amount distribution for the respective first blocks that is a distribution of amounts of voltage drop which occurs in each of the anode-side power wire network 112 and the cathode-side power wire network 113 when a current dependent on the video data flows through each of the first blocks.

Meanwhile, the voltage regulating unit divides the pixels into second blocks each made up of pixels in Yv rows by Yh columns (where Yv is an integer of 2 or greater which is different from Xv and Yh is an integer of 2 or greater which is different from Xh). The voltage regulating unit then sets the anode-side power wire network 112 and the cathode-side power wire network 113 to supply the power source voltage for each of the second blocks, sets a second block row resistance component Rah2' that is a row-wise resistance component corresponding to the second block in the anode-side power wire network 112, to a value obtained by multiplying a row-wise resistance component Rah corresponding to a pixel in the anode-side power wire network 112 by (Yh/Yv), and sets a second block column resistance component Rav2' that is a column-wise resistance component corresponding to the second block in the anode-side power wire network 112, to a value obtained by multiplying a column-wise resistance component Rav corresponding to a pixel in the anode-side power wire network 112 by (Yv/Yh). Furthermore, the voltage regulating unit sets a second block row resistance component Rch2' that is a row-wise resistance component corresponding to the second block in the cathode-side power wire network 113, to a value obtained by multiplying a row-wise resistance component Rch corresponding to a pixel in the cathode-side power wire network 113 by (Yh/Yv), and sets a second block column resistance component Rcv2' that is a column-wise resistance component corresponding to the second block in the cathode-side power wire network 113, to a value obtained by multiplying a column-wise resistance component Rcv corresponding to a pixel in the cathode-side power wire network 113 by (Yv/Yh) With this, the voltage regulating unit estimates a voltage drop amount distribution for the respective second blocks that is a distribution of amounts of voltage drop which occurs in each of the anode-side power wire network 112 and the cathode-side power wire network 113 when a current dependent on the video data flows through each of the second blocks.

At the end, the voltage regulating unit estimates a voltage drop amount distribution for the respective pixels from the voltage drop amount distribution estimated for the respective first blocks and the voltage drop amount distribution estimated for the respective second blocks.

It is to be noted that the display device according to this embodiment is almost the same in structure as the display device according to the display device 100 according to Embodiment 1 except the function of the voltage drop amount calculating circuit 150 that is an example of the voltage regulating unit.

Figure 13:
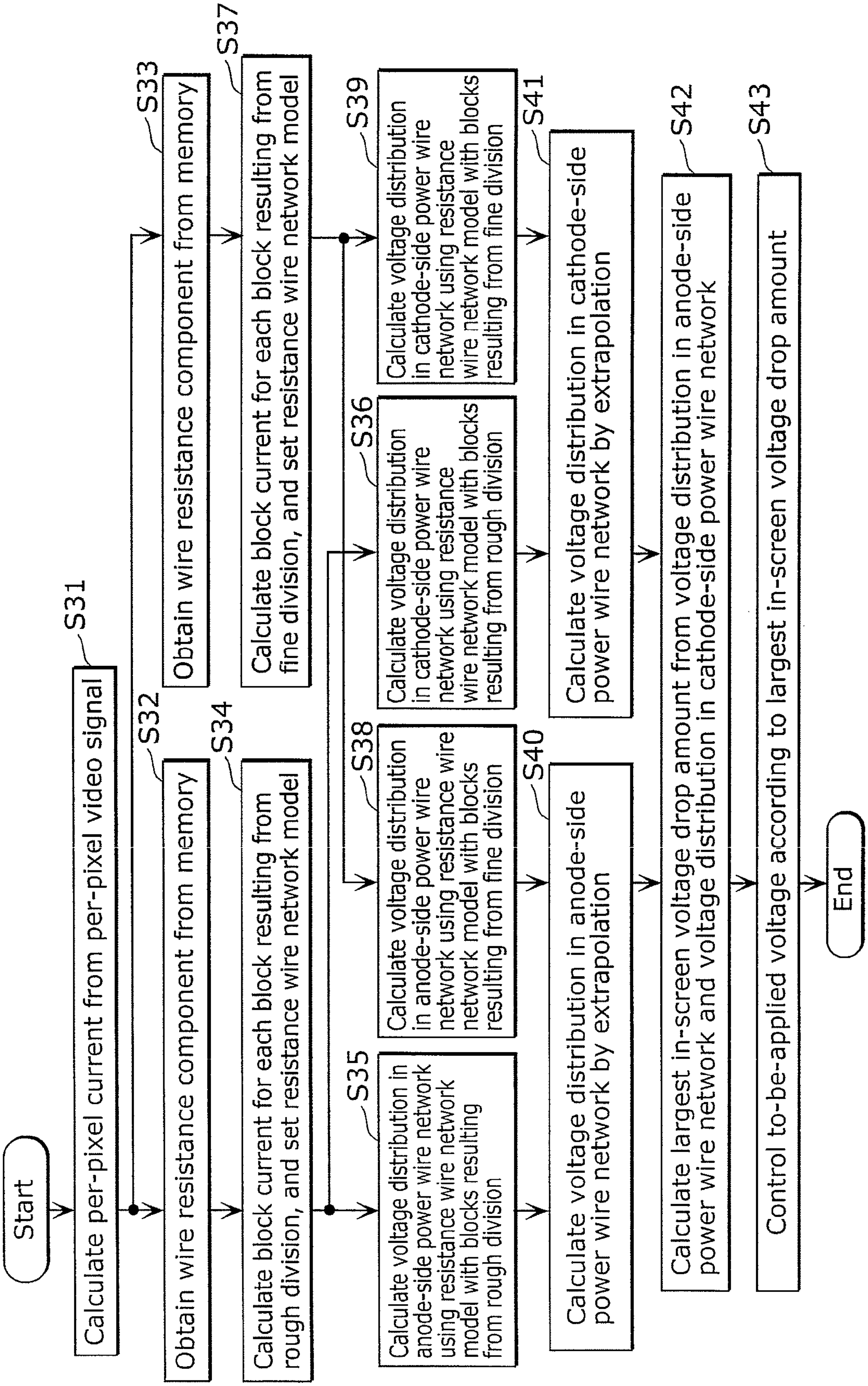
FIG. 13 is a flowchart illustrating an operation of a display device according to Embodiment 3.

FIG. 13 is a flowchart illustrating an operation of the display device according to Embodiment 3.

First, using a preset conversion expression or conversion table for video signals and pixel currents, the voltage drop amount calculating circuit 150 calculates, from the video signal, a current which flows through each pixel (Step S31). It is to be noted that this process of calculating a current which flows through each pixel (Step S31) is the same or alike as the process of calculating a current which flows through each pixel (Step S11) described in Embodiment 1 and therefore is not described in detail.

Next, the voltage drop amount calculating circuit 150 obtains, from the memory 155, the pixel row resistance component Rah and pixel column resistance component Rav of the anode-side power wire network 112 and the pixel row resistance component Rch and the pixel column resistance component Rcv of the cathode-side power wire network 113 (Step S32).

Next, in the same or like manner as the creation of a resistance wire network model described in Embodiment 1, the voltage drop amount calculating circuit 150 calculates a block current for each block resulting from rough division and creates a resistance wire network model (Step S34). Here, the resistance wire model in which the pixels are roughly divided into blocks is described.

Figure 14:
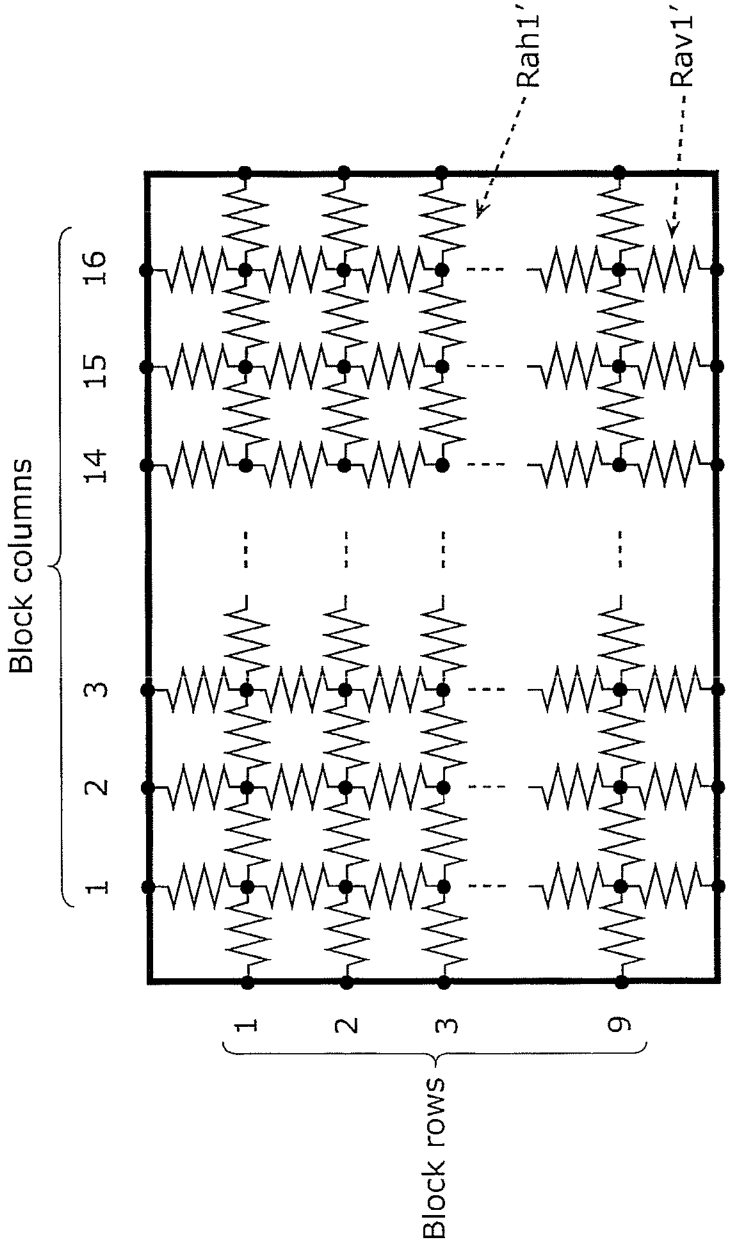
FIG. 14 schematically illustrates a model of an anode-side power wire in the case where one block is made up of 120 pixel rows by 120 pixel columns.

FIG. 14 schematically illustrates a model of the anode-side power wire network 112 in the case where one block is made up of 120 pixel rows by 120 pixel columns in the organic EL display unit 110 which has 1920 pixel columns by 1080 pixel rows. The above one block corresponds to the first block.

Each block is connected to the upper, lower, right and left neighboring blocks by the pixel row resistance component Rah1' and the pixel column resistance component Rav1', and has its periphery connected to the anode-side electrode to which the external voltage is applied. In other words, it is assumed that one block (120×120 pixels) is located at an intersection of the pixel row resistance component Rah1' and the pixel column resistance component Rav1'. In this case, the pixel row resistance component Rah1' and the pixel column resistance component Rav1' are obtained as follows with reference to Expressions 1 and 2.

$$Rah1'=Rah\times(Xh/Xv)=Rah\times(120/120)=Rah$$

$$Rah1'=Rav\times(Xv/Xh)=Rav\times(120/120)=Rav$$

Next, the voltage drop amount calculating circuit 150 calculates a voltage distribution in the anode-side power wire network 112 in which the pixels are roughly divided into blocks as shown in FIG. 14 (Step S35).

Here, the calculation procedure for the voltage distribution in the anode-side power wire network 112 in which the pixels are roughly divided into blocks is the same or alike as the calculation procedure described in Embodiment 1 and with reference to FIG. 8.

FIG. 15 is a table indicating a voltage drop amount for each block, calculated when the pixels are roughly divided into blocks.

As shown in this figure, a voltage drop amount is calculated in association with a block row and a block column. For example, the calculated voltage drop amount at the block in the central area of the organic EL display unit 110, that is, at block coordinates (8, 5), is 9.0 V.

Furthermore, it is possible to obtain the maximum in-screen voltage drop value va1max at which the voltage drop amount va1(k, l) is largest in the anode-side power wire network 112 when the pixels are roughly divided into blocks.

Likewise, simultaneous equations are obtained and solved for the cathode-side power wire network 113 to obtain a voltage drop amount vc1 (k, l) for each block in the cathode-side power wire network 113 with a model in which one block is made up of 120 pixel rows by 120 pixel rows. In other words, the voltage distribution in the cathode-side power wire network 113 is calculated for respective blocks (each made up of horizontal 120 pixel columns by vertical 120 pixel rows) resulting from rough division (Step S36).

Next, after Step S31, the voltage drop amount calculating circuit 150 obtains, from the memory 155, the pixel row resistance component Rah and pixel column resistance component Rav of the anode-side power wire network 112 and the pixel row resistance component Rch and the pixel column resistance component Rcv of the cathode-side power wire network 113 (Step S33).

Next, the voltage drop amount calculating circuit 150 calculates a block current for each block resulting from fine division and creates a resistance wire network model (Step S37). Here, the resistance wire model in which the pixels are finely divided into blocks is described.

Figure 16:
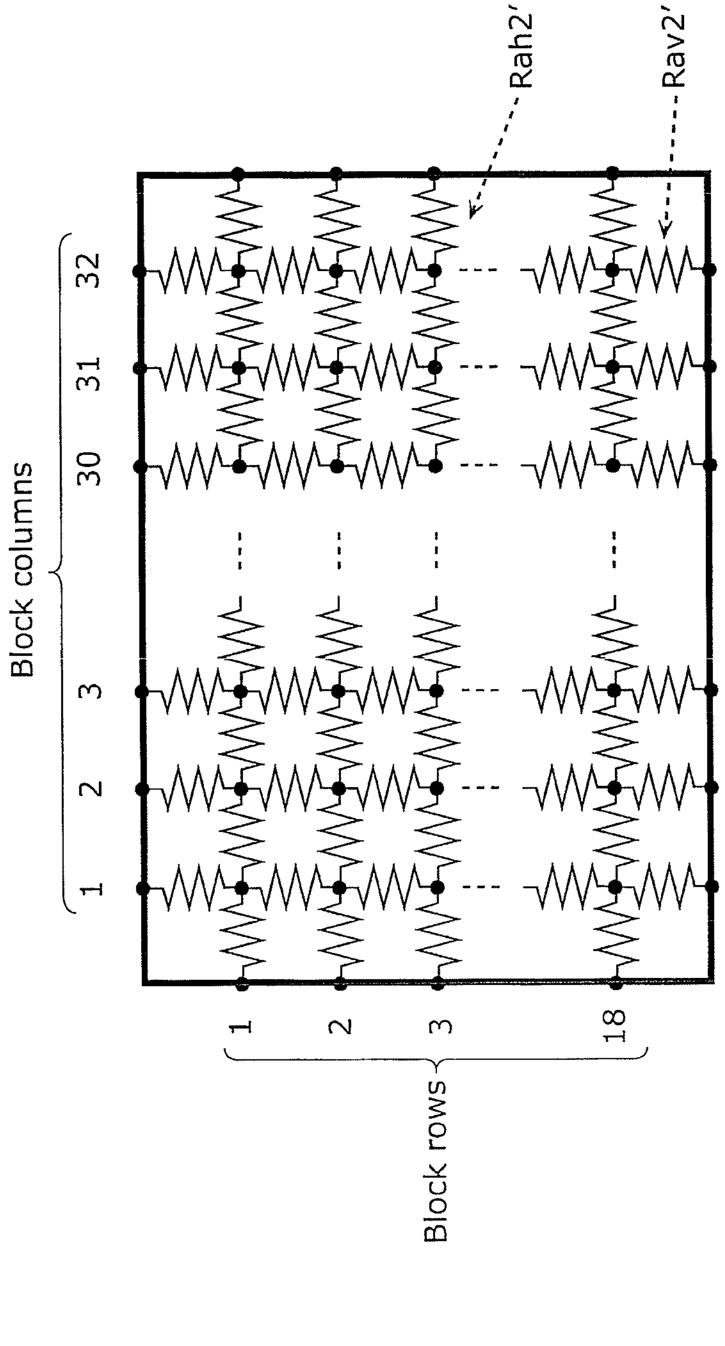
FIG. 16 schematically illustrates a model of an anode-side power wire in the case where one block is made up of 60 pixel rows by 60 pixel columns.

FIG. 16 schematically illustrates a model of the anode-side power wire network 112 in the case where one block is made up of 60 pixel rows by 60 pixel columns in the organic EL display unit 110 which has 1920 pixel columns by 1080 pixel rows. The above one block corresponds to the second block.

Each block is connected to the upper, lower, right and left neighboring blocks by the pixel row resistance component Rah2' and the pixel column resistance component Rav2', and has its periphery connected to the anode-side electrode to which the external voltage is applied. In other words, it is assumed that one block (60×60 pixels) is located at an intersection of the pixel row resistance component Rah2' and the pixel column resistance component Rav2'. In this case, the pixel row resistance component Rah2' and the pixel column resistance component Rav2' are obtained as follows with reference to Expressions 1 and 2.

$$Rah2'=Rah\times(Yh/Yv)=Rah\times(60/60)=Rah$$

$$Rah2'=Rav\times(Yv/Yh)=Rav\times(60/60)=Rav$$

Next, the voltage drop amount calculating circuit 150 calculates a voltage distribution in the anode-side power wire network 112 in which the pixels are finely divided into blocks as shown in FIG. 16 (Step S38).

Here, the calculation procedure for the voltage distribution in the cathode-side power wire network 113 in which the pixels are finely divided into blocks is the same or alike as the calculation procedure described in Embodiment 1 and with reference to FIG. 8.

FIG. 17 is a table indicating a voltage drop amount for each block, calculated when the pixels are finely divided into blocks.

As shown in this figure, a voltage drop amount is calculated in association with a block row and a block column. For example, the calculated voltage drop amount at the block in the central area of the organic EL display unit 110, that is, at block coordinates (16, 9), is 8.5 V.

Furthermore, it is possible to obtain the maximum in-screen voltage drop value va2max at which the voltage drop amount va2(k, l) is largest in the anode-side power wire network 112 when the pixels are finely divided into blocks. In other words, it is possible to obtain the maximum in-screen voltage drop value v2max at which the sum of the anode-side drop amount and the cathode-side drop amount, |va2(k, l)|+|vc2(k, l)|, is largest among the pixels.

Likewise, simultaneous equations are obtained and solved for the cathode-side power wire network 113 to obtain a voltage drop amount vc2 (k, l) for each block in the cathode-side power wire network 113 with a model in which one block is made up of 60 pixel rows by 60 pixel rows. In other words, the voltage distribution in the cathode-side power wire network 113 is calculated for each block (having 60 pixel columns by 60 pixel rows) resulting from fine division (Step S39).

Next, the voltage drop amount calculating circuit 150 calculates, for each of the pixels 111, a voltage drop amount in the anode-side power wire network 112, from the voltage drop amount va1(k, l) calculated in the process of calculating the voltage distribution in the anode-side power wire network 112 using the resistance wire model in which the pixels are roughly divided into blocks (Step S35) and the voltage drop amount va2(k, l) calculated in the process of calculating the voltage distribution in the anode-side power wire network 112 using the resistance wire model in which the pixels are finely divided into blocks (Step S38). Specifically, the voltage drop amount in the anode-side power wire network 112 for each of the pixels is calculated by extrapolation using the voltage drop amount va1(k, l) calculated when the pixels are roughly divided into blocks and the voltage drop amount va2(k, l) calculated when the pixels are finely divided into blocks (Step S40).

Here, the extrapolation-used calculation procedure for a voltage drop amount for each of the pixels 111 is described.

Although it is possible to obtain two maximum voltage drop values va1max and va1max from the calculation results obtained when the pixels are divided into respective blocks having two different sizes, there is an error between each of these values and the actual maximum voltage drop value as a result of the division into blocks. In other words, the maximum voltage drop value va1max in the anode-side power wire network 112 in which the pixels are roughly divided into blocks and the maximum voltage drop value va2max in the anode-side power wire network 112 in which the pixels are finely divided into blocks have errors with respect to the maximum voltage drop value in the anode-side power wire network 112 among the pixels 111.

Figure 18:
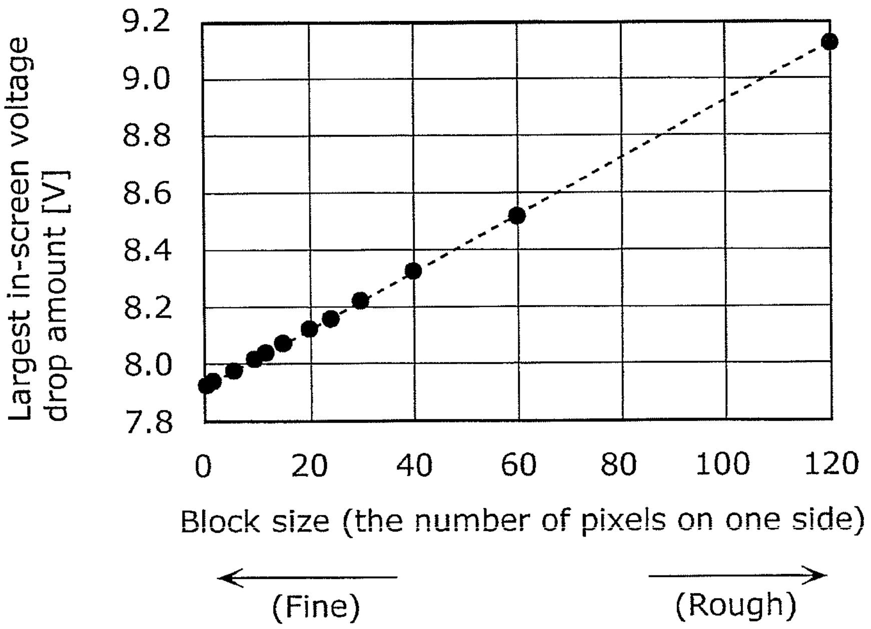
FIG. 18 is a graph indicating a relationship between the number of pixels which is determined at the time of division and the maximum voltage drop value calculated from the model resulting from the division.

FIG. 18 is a graph indicating a relationship between the block size determined at the time of division and the maximum voltage drop value calculated from the model resulting from the division.

In FIG. 18, the voltage drop amount calculated using the model with a larger block size has a greater error with respect to the true voltage drop amount, that is, a voltage drop amount calculated in the case of the block size 1.

Furthermore, the relationship between the block size and the error can be seen as being approximately proportional, which shows that, through the extrapolation using the voltage drop amounts calculated using two different block models, it is possible to determine an extrapolated voltage drop amount the error of which is sufficiently small with respect to the true voltage drop amount, that is, the voltage drop amount calculated in the case of the block size 1 (when the number of pixels 111 included in one block is 1).

Therefore, using the maximum voltage drop value va1max obtained using the model in which the block size is 120 by 120 pixels and the maximum voltage drop value va2max obtained using the model in which the block size is 60 by 60 pixels, an extrapolated voltage drop amount vamax that is calculated when the block size is 1 by 1 pixel is calculated by the following Expression 4.

$$vamax = va2max - (va1max - va2max) \times (60-1)/(120-60) \quad \text{(Expression 4)}$$

Specifically, in this embodiment, the voltage drop amount calculating circuit 150 calculates a distribution of voltage drop amounts in the anode-side power wire network 112 for the respective blocks resulting from rough division and each having 120 by 120 pixels 111 obtained by dividing the pixels 111 into blocks, calculates a distribution of voltage drop amounts in the anode-side power wire network 112 for the respective blocks resulting from fine division and each having 60 by 60 pixels 111 obtained by dividing the pixels 111 into blocks, and estimates a distribution of voltage drop amounts in the anode-side power wire network 112 for the respective pixels 111 from the distribution of voltage drop amounts calculated for the respective blocks resulting from rough division and the distribution of voltage drop amounts calculated for the respective blocks resulting from fine division.

Likewise, also for the cathode-side power wire network 113, the voltage drop amount calculating circuit 150 obtains a voltage drop amount in the cathode-side power wire network 113 for each of the pixels 111 from the voltage drop amount vc1(k, l) calculated in the process of calculating the voltage distribution in the cathode-side power wire network 113 using the resistance wire network model resulting from rough division (Step S36) and the voltage drop amount vc2(k, l) calculated in the process of calculating the voltage distribution in the cathode-side power wire network 113 using the resistance wire network model resulting from fine division (Step S39). Specifically, the voltage drop amount in the cathode-side power wire network 113 for each of the pixels is calculated by extrapolation using the voltage drop amount vc1(k, l) calculated when the pixels are roughly divided into blocks and the voltage drop amount vc2(k, l) calculated when the pixels are finely divided into blocks (Step S41).

Next, the maximum in-screen voltage drop value at which the sum of the voltage drop amount in the anode-side power wire network 112 and the voltage drop amount in the cathode-side power wire network 113 is largest among the pixels 111 is calculated from the voltage drop amounts in the anode-side power wire network 112 for the pixels 111 estimated in the process of calculating voltage drop amounts in the anode-side power wire network 112 by extrapolation (Step S40) and the voltage drop amounts in the cathode-side power wire network 113 for the respective pixels 111 estimated in the process of calculating voltage drop amounts in the cathode-side power wire network 113 by extrapolation (Step S41). Here, the process of calculating the maximum in-screen voltage drop value (Step S42) is the same or alike as the process of calculating the maximum in-screen voltage drop value vmax (Step S16) described in Embodiment 1, and therefore is not described in detail.

At the end, the signal processing circuit 160 controls an external voltage to be applied, which is output by the variable-voltage source 170, according to the maximum voltage drop value calculated by the voltage drop amount calculating circuit 150 (Step S43). The process of controlling the external voltage to be applied, which is output by the variable-voltage source 170, (Step S43) is the same or alike as the process of controlling the external voltage to be applied (Step S17), descried in Embodiment 1, and therefore is not described in detail.

As above, instead of two calculations of 1920×1080 simple simultaneous equations for the anode-side power wire network 112 and the cathode-side power wire network 113, 16×9 simple simultaneous equations and 32×18 simple simultaneous equations are each calculated twice in the method using the division into blocks.

In the case of using, for example, the Gauss-Jordan method to solve the simple simultaneous equations, the operation amount increases in proportion to the square of a base, which means that the amount of calculation can be cut by approximately one 12 millionth when the pixels are divided into blocks as in this embodiment.

As above, the pixels are divided into blocks with two different sizes for which the respective resistance wire models are then created, and the voltage drop amounts are calculated using such resistance wire models, which considerably reduces the amount of calculation, with the result that a display device which is excellent in low-power-consumption drive can be provided using a low-cost calculating circuit.

Thus, as compared to the display device 100 according to Embodiment 1, in the display device according to this embodiment, the voltage drop amount calculating circuit 150 calculates a distribution of voltage drop amounts in the anode-side power wire network 112 for the respective blocks resulting from rough division and each having 120 by 120 pixels 111 obtained by dividing the pixels 111 into blocks, calculates a distribution of voltage drop amounts in the anode-side power wire network 112 for the respective blocks resulting from fine division and each having 60 by 60 pixels 111 obtained by dividing the pixels 111 into blocks, and estimates a distribution of voltage drop amounts in the anode-side power wire network 112 for the respective pixels 111 from the distribution of voltage drop amounts calculated for the respective blocks resulting from rough division and the distribution of voltage drop amounts calculated for the respective blocks resulting from fine division. The same applies to the cathode-side power wire network 113.

By doing so, the display device according to this embodiment is capable of achieving both a significant reduction in the calculation amount and an increase in accuracy in the voltage drop amount calculation. Thus, the calculating circuit can be so designed to save space and allows a reduction in cost.

Each of the structural elements in each of the above embodiments may be configured in the form of an exclusive hardware product or may be realized by executing a software program suitable for the structural element. Each of the structural elements may be realized by means of a program executing unit, such as a central processing unit (CPU) and a processor, reading and executing the software program recorded on a recording medium such as a hard disk or a semiconductor memory. Here, the software program for realizing the method of driving the display device according to each of the above embodiments is a program described below.

The program causes a computer to: divide the pixels into first blocks each made up of pixels in Xv rows and Xh columns (where Xv and Xh are integers of 2 or greater), and set the power wires to supply the power source voltage for each of the first blocks; set a first block row resistance component, which is a row-wise resistance component of each of the power wires for each of the first blocks, to a value obtained by multiplying the pixel row resistance component by (Xh/Xv), and set a first block column resistance component, which is a column-wise resistance component of each of the power wires for each of the first blocks, to a value obtained by multiplying the pixel column resistance component by (Xv/Xh); estimate a voltage drop amount distribution for the first blocks that is a distribution of amounts of voltage drop which occurs in each of the power wires when a current dependent on the video data flows through each of the first blocks; and regulate, based on the voltage drop amount distribution estimated in the estimating, the voltage to be supplied to the display unit.

Although the display device and the method of driving the display device according to one or more aspects have been described above based on the embodiments, the present invention is not limited to these embodiments. The scope of one or more aspects may include an embodiment obtained by making to these embodiments various modifications which a person skilled in the art could think of, and an embodiment obtained by combining structural elements in different embodiments, unless such obtained embodiments do not depart from the principles and spirit of the present invention.

Figure 19:
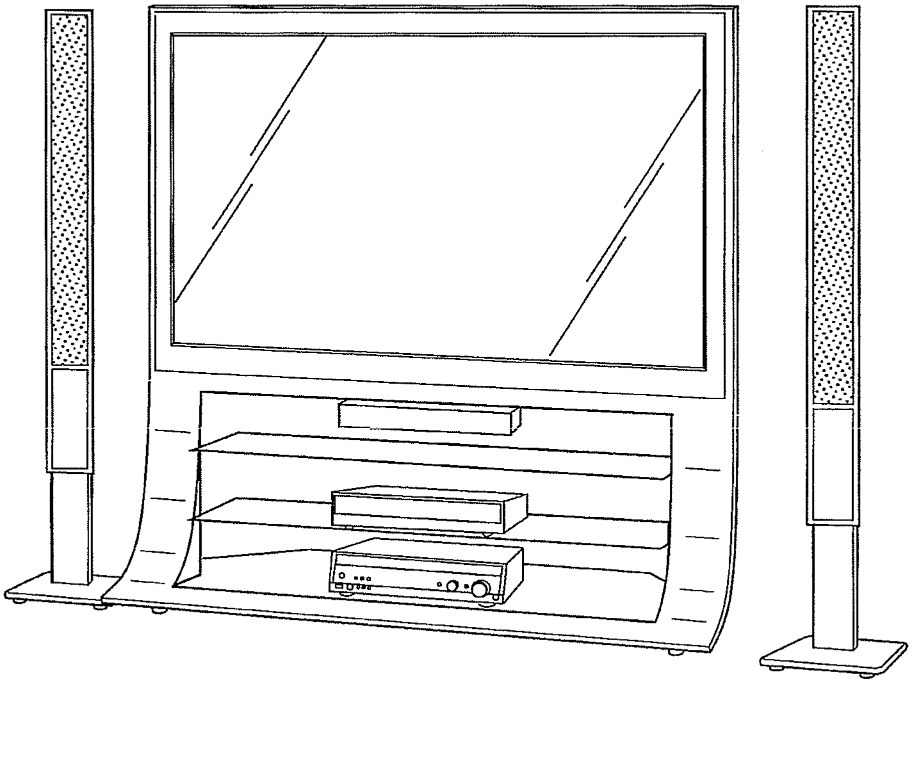
FIG. 19 is an external view of a thin flat TV in which the display device is built.
Figure 20:
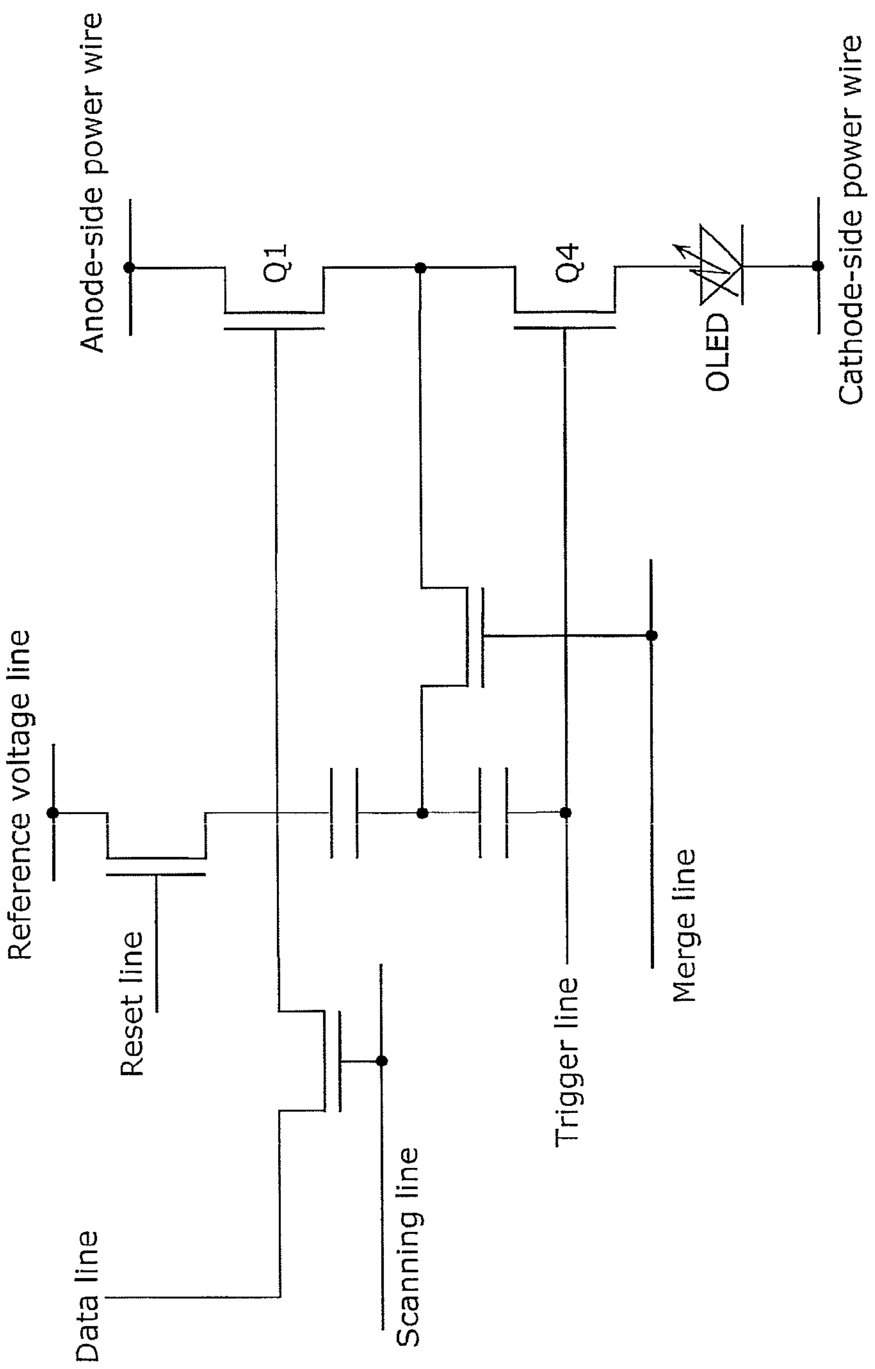
PRIOR ART FIG. 20
FIG. 20 is a circuit diagram illustrating a circuit configuration of a pixel which drives an organic EL element proposed in PTL 2.

For example, the display device according to an aspect of the present invention is built in a thin, flat TV shown in FIG. 19. With the display device according to an aspect of the present invention built in, the thin, flat TV is capable of displaying accurate images which reflect video signals and consumes less power.

In each of the above embodiments, the voltage drop amounts in the anode-side power wire network 112 for the respective blocks and the voltage drop amounts in the cathode-side power wire network 113 for the respective blocks are added up for the respective pixels 111, and the maximum value vmax of resultant total voltage drop amounts is used to regulate the external voltage to be applied. In this regard, it may be that the maximum value of voltage drop amounts for the respective blocks in the anode-side power wire network 112 and the maximum value of voltage drop amounts for the respective blocks in the cathode-side power wire network 113 are calculated, and the sum of the calculated maximum value of voltage drop amounts in the anode-side power wire network 112 and the calculated maximum value of voltage drop amounts in the cathode-side power wire network 113 is used to regulate the external voltage to be applied.

By doing so, even when a plurality of power wires (the anode-side power wire network 112 and the cathode-side power wire network 113) are included, a luminance decrease in the pixel 111 due to voltage shortage can be prevented.

In the above Embodiment 3, using the anode-side power wire network 112 in which the pixels are roughly divided into blocks and the anode-side power wire network 112 in which the pixels are finely divided into blocks, the voltage drops in the anode-side power wire network 112 for the respective pixels 111 are estimated and used together with the voltage drops in the cathode-side power wire network 113 for the respective pixels 111 estimated likewise, to calculate a total voltage drop amount distribution, and from this calculation result, the maximum in-screen voltage drop among the respective pixels 111 is estimated. In this regard, it may be that the anode-side power wire network 112 for the respective blocks resulting from rough division and the cathode-side power wire network 113 for the respective blocks resulting from rough division are used to calculate a total voltage drop amount distribution for the respective blocks resulting from rough division, and likewise, a total voltage drop amount distribution is calculated for the respective blocks resulting from fine division, and using the total voltage drop amount distribution calculated for the respective blocks resulting from rough division and the total voltage drop amount distribution calculated for the respective blocks resulting from fine division, a total voltage drop amount distribution is estimated for the respective pixels 111, and from the estimation result, the largest in-screen voltage drop is estimated.

Although the number of pixels 111 included in one block is the same between the pixel row direction (the column direction) and the pixel column direction (the row direction) in the above Embodiment 3, the number of pixels 111 in the pixel row direction and the number of pixels 111 in the pixel column direction may be different from each other.

Although both the anode-side voltage and the cathode-side voltage which are output from the variable-voltage source 170 are regulated in each of the above embodiments, it may be that either one of these voltages is regulated.

Although a voltage drop amount distribution in the anode-side power wire network 112 and a voltage drop amount distribution in the cathode-side power wire network 113 are estimated to regulate an external voltage to be applied in each of the above embodiments, it may be that one of the voltage drop amount distribution in the anode-side power wire network 112 and the voltage drop amount distribution in the cathode-side power wire network 113 is estimated and based on the estimated one of the voltage drop amount distributions, an external voltage to be applied is regulated.

Although the switch transistor 124 and the driving transistor 125 are stated as P-type transistors in the above embodiments, these transistors may be N-type transistors.

The switch transistor 124 and the driving transistor 126 are stated as TFTs, but may be other field-effect transistors.

Processing units included in the display device according to the above embodiments are implemented typically as large-scale integration (LSI) that is an integrated circuit. It is also possible that parts of the processing units included in the display devices 100 and 300 are integrated on a single substrate of the organic EL display unit 110. The processing units may be implemented as a dedicated circuit or a general-purpose processor. It is also possible to use a field programmable gate array (FPGA) that can be programmed after manufacturing LSIs, or a reconfigurable processor that allows re-configuration of the connection or setting of circuit cells inside the LSIs.

Furthermore, part of the functions of the data line driving circuit, the write scan driving circuit, the control circuit, the voltage drop amount calculating circuit, and the signal processing circuit which are included in the display device according to an embodiment of the present invention may be implemented by a processor, such as a CPU, executing the program. Moreover, the present invention may be implemented as a method of driving a display device, which includes characteristic steps implemented by the processing units included in the display devices 100 and 300.

Although the above describes, as an example, the case where the display device is an active-matrix organic EL display device, the present invention may be applied to an organic EL display device other than the active-matrix organic EL display device and may also be applied to a display device other than the organic EL display device using the current-driven light-emitting elements, such as a liquid crystal display device.

The display device 100 according to Embodiment 1 calculates, using a newly-set block-based resistance wire network, voltage drop amounts which correspond to video, to set the minimum necessary external voltage to be applied, and the display device 300 according to Embodiment 2 calculates, using a newly-set block-based resistance wire network, voltage drop amounts which correspond to video, to correct video signals. A display device which has functions of both the display devices 100 and 300 is preferred and included in the technical scope of the present invention. In other words, the above display device calculates, using a newly-set block-based resistance wire network, voltage drop amounts which correspond to video, thereby setting the minimum necessary external voltage to be applied and correcting video signals. By doing so, as compared to the case of calculating a pixel-based voltage drop amount distribution, the amount of calculation can be significantly reduced, and the memory capacity can be reduced. This allows a reduction in cost. Furthermore, this allows a reduction in power consumption and a reduction in luminance variations in the display panel. In addition, also in this display device, it is further possible to significantly recue the calculation time by determining the number of blocks in the resistance wire model so that a resistance component in the pixel column direction and a resistance component in the pixel row direction become equal in each block.

INDUSTRIAL APPLICABILITY

The present invention can provide the display device which causes less luminance variations and is excellent in low-power-consumption drive, and is useful especially for an active organic EL flat panel display.

REFERENCE SIGNS LIST

100, 300 Display device
110 Organic EL display unit
111 Pixel
112 Anode-side power wire network
113 Cathode-side power wire network
120 Data line driving circuit
121, OLED Organic EL element
122 Data line
123 Scanning line
124, Q4 Switch transistor
125 Driving transistor
126 Capacitor
130 Write scan driving circuit
140 Control circuit
150 Voltage drop amount calculating circuit
155 Memory
160, 360 Signal processing circuit
170 Variable-voltage source
Q1 Driver transistor

The invention claimed is:

1. A display device, comprising:

a display including a plurality of pixels arranged in rows and columns;

a voltage source that supplies a power source voltage to the display; and a voltage regulator configured to regulate a voltage to be supplied to the display, according to video data indicating a luminance of each of the pixels, wherein the display further includes one or more power wires connected to the pixels and the voltage source and through which the power source voltage is supplied from the voltage source, the one or more power wires each including a pixel row resistance component that is a row-wise resistance component for each of the pixels and a pixel column resistance component that is a column-wise resistance component for each of the pixels, and the voltage regulator is configured to:

divide the pixels into first blocks each made up of pixels in Xv rows and Xh columns where Xv and Xh are integers of 2 or greater, and set the power wires to transfer the power source voltage for each of the first blocks;

set a first block row resistance component to a value obtained by multiplying the pixel row resistance component by Xh/Xv, and set a first block column resistance component to a value obtained by multiplying the pixel column resistance component by Xv/Xh, the first block row resistance component being a row-wise resistance component of each of the power wires for each of the first blocks, the first block column resistance component being a column-wise resistance component of each of the power wires for each of the first blocks;

set the Xv and the Xh with which the first block column resistance component and the first block row resistance component are equal; and estimate a voltage drop amount distribution for the first blocks that is a distribution of amounts of voltage drop which occurs in the power wires when a current dependent on the video data flows through each of the first blocks, and regulate, based on the estimated voltage drop amount distribution, the voltage to be supplied to the display.

2. The display device according to claim 1, wherein the voltage which is regulated by the voltage regulator is the power source voltage.

3. The display device according to claim 1, wherein the voltage which is regulated by the voltage regulator is a signal voltage which results from conversion of the video data and is to be applied to each of the pixels.

4. The display device according to claim 1, wherein the voltage which is regulated by the voltage regulator is the power source voltage and a signal voltage which results from conversion of the video data and is to be applied to each of the pixels.

5. The display device according to claim 1, wherein the voltage regulator is further configured to:

divide the pixels into second blocks each made up of pixels in Yv rows and Yh columns where Yv is an integer of 2 or greater which is different from Xv and Yh is an integer of 2 or greater which is different from Xh, and set the power wires to transfer the power source voltage for each of the second blocks;

set a second block row resistance component to a value obtained by multiplying the pixel row resistance component by Yh/Yv, and set a second block column resistance component to a value obtained by multiplying the pixel column resistance component by Yv/Yh, the second block row resistance component being a row-wise resistance component of each of the power wires for each of the second blocks, the second block column resistance component being a column-wise resistance component of each of the power wires for each of the second blocks;

estimate a voltage drop amount distribution for the second blocks that is a distribution of amounts of voltage drop which occurs in the power wires when a current dependent on the video data flows through each of the second blocks; and estimate a voltage drop amount distribution for the pixels from the voltage drop amount distribution estimated for the first blocks and the voltage drop amount distribution estimated for the second blocks.

6. The display device according claim 1, wherein the voltage regulator is configured to regulate the voltage using a maximum value in the estimated voltage drop amount distribution for the first blocks.

7. The display device according to claim 1, wherein the voltage source supplies a first voltage and a second voltage to the display unit, the second voltage being different from the first voltage, the one or more power wires include a first power wire through which the first voltage is supplied and a second power wire through which the second voltage is supplied, and the voltage regulator is configured to estimate a first distribution and a second distribution for the first blocks, and regulate the first voltage and the second voltage based on the first distribution and the second distribution, respectively, the first distribution being a distribution of amounts of voltage drop which occurs in the first power wire, the second distribution being a distribution of amounts of voltage drop which occurs in the second power wire.

8. The display device according to claim 7, wherein the voltage regulator is configured to regulate the first voltage and the second voltage according to a sum of a maximum value in the first distribution and a maximum value in the second distribution.

9. The display device according to claim 7, wherein the voltage regulator is configured to compute a total voltage drop amount distribution by adding up the first distribution and the second distribution for the respective first blocks, and regulate the first voltage and the second voltage based on the computed total voltage drop amount distribution, the total voltage drop amount distribution being a sum of the amounts of voltage drop which occurs in the first power wire and the amounts of voltage drop which occurs in the second power wire.

10. The display device according to claim 9, wherein the voltage regulator is configured to regulate the first voltage and the second voltage using a maximum value in the total voltage drop amount distribution.

11. The display device according to claim 1, wherein each of the pixels includes a driver and a light-emitting element, the driver includes a source electrode and a drain electrode, the light-emitting element includes a first electrode and a second electrode, the first electrode being connected to one of the source electrode and the drain electrode of the driver, and one of (i) the other of the source electrode and the drain electrode and (ii) the second electrode is connected to the first power wire, and the other of (i) the other of the source electrode and the drain electrode and (ii) the second electrode is connected to the second power wire.

12. The display device according to claim 11, wherein the second electrode forms a part of a common electrode provided in common with the pixels, and the common electrode is electrically connected to the voltage source to allow a potential to be applied from a periphery of the common electrode.

13. The display device according to claim 12, wherein the second electrode is formed of a transparent conductive material made of a metal oxide.

14. The display device according to claim 11, wherein the light-emitting element is an organic electroluminescence (EL) element.

15. A method of driving a display device, which includes a display including a plurality of pixels arranged in rows and columns, and a voltage source that supplies a power source voltage to the display, the display further including one or more power wires connected to the pixels and the voltage source and through which the power source voltage is supplied from the voltage source, the one or more power wires each including a pixel row resistance component that is a row-wise resistance component for each of the pixels and a pixel column resistance component that is a column-wise resistance component for each of the pixels, the method comprising:

dividing the pixels into first blocks each made up of pixels in Xv rows and Xh columns where Xv and Xh are integers of 2 or greater, and setting the power wires to supply the power source voltage for each of the first blocks, wherein, in the dividing, the Xv and the Xh are set with which the first block column resistance component and the first block row resistance component are equal;

setting a first block row resistance component to a value obtained by multiplying the pixel row resistance component by Xh/Xv, and setting a first block column resistance component to a value obtained by multiplying the pixel column resistance component by Xv/Xh, the first block row resistance component being a row-wise resistance component of each of the power wires for each of the first blocks, the first block column resistance component being a column-wise resistance component of each of the power wires for each of the first blocks;

estimating a voltage drop amount distribution for the first blocks that is a distribution of amounts of voltage drop which occurs in the power wires when a current dependent on video data flows through each of the first blocks; and regulating, based on the voltage drop amount distribution estimated in the estimating, a voltage to be supplied to the display.

16. The method of driving a display device according to claim 15, wherein, in the regulating, the power source voltage is regulated based on the voltage drop amount distribution estimated in the estimating.

17. The method of driving a display device according to claim 15, wherein, in the regulating, a signal voltage which results from conversion of the video data and is to be applied to each of the pixels is regulated based on the voltage drop amount distribution estimated in the estimating.

18. The method of driving a display device according to claim 15, wherein, in the regulating, the power source voltage and a signal voltage to be applied to each of the pixels are regulated based on the voltage drop amount distribution estimated in the estimating.

19. A display device, comprising:

a display including a plurality of pixels arranged in rows and columns;

a voltage source that supplies a power source voltage to the display; and a voltage regulator configured to regulate a voltage to be supplied to the display, according to video data indicating a luminance of each of the pixels, wherein the display further includes one or more power wires connected to the pixels and the voltage source and through which the power source voltage is supplied from the voltage source, the one or more power wires each including a pixel row resistance component that is a row-wise resistance component for each of the pixels and a pixel column resistance component that is a column-wise resistance component for each of the pixels, and the voltage regulator is configured to:

divide the pixels into first blocks each made up of pixels in Xv rows and Xh columns where Xv and Xh are integers of 2 or greater, and set the power wires to transfer the power source voltage for each of the first blocks;

set a first block row resistance component to a value obtained by multiplying the pixel row resistance component by Xh/Xv, and set a first block column resistance component to a value obtained by multiplying the pixel column resistance component by Xv/Xh, the first block row resistance component being a row-wise resistance component of each of the power wires for each of the first blocks, the first block column resistance component being a column-wise resistance component of each of the power wires for each of the first blocks;

estimate a voltage drop amount distribution for the first blocks that is a distribution of amounts of voltage drop which occurs in the power wires when a current dependent on the video data flows through each of the first blocks, and regulate, based on the estimated voltage drop amount distribution, the voltage to be supplied to the display;

divide the pixels into second blocks each made up of pixels in Yv rows and Yh columns where Yv is an integer of 2 or greater which is different from Xv and Yh is an integer of 2 or greater which is different from Xh, and set the power wires to transfer the power source voltage for each of the second blocks;

set a second block row resistance component to a value obtained by multiplying the pixel row resistance component by Yh/Yv, and set a second block column resistance component to a value obtained by multiplying the pixel column resistance component by Yv/Yh, the second block row resistance component being a row-wise resistance component of each of the power wires for each of the second blocks, the second block column resistance component being a column-wise resistance component of each of the power wires for each of the second blocks;

estimate a voltage drop amount distribution for the second blocks that is a distribution of amounts of voltage drop which occurs in the power wires when a current dependent on the video data flows through each of the second blocks; and estimate a voltage drop amount distribution for the pixels from the voltage drop amount distribution estimated for the first blocks and the voltage drop amount distribution estimated for the second blocks.

20. A display device, comprising:

a display including a plurality of pixels arranged in rows and columns;

a voltage source that supplies a power source voltage to the display; and a voltage regulator configured to regulate a voltage to be supplied to the display, according to video data indicating a luminance of each of the pixels, wherein the display further includes one or more power wires connected to the pixels and the voltage source and through which the power source voltage is supplied from the voltage source, the one or more power wires each including a pixel row resistance component that is a row-wise resistance component for each of the pixels and a pixel column resistance component that is a column-wise resistance component for each of the pixels, and the voltage regulator is configured to:

divide the pixels into first blocks each made up of pixels in Xv rows and Xh columns where Xv and Xh are integers of 2 or greater, and set the power wires to transfer the power source voltage for each of the first blocks;

set a first block row resistance component to a value obtained by multiplying the pixel row resistance component by Xh/Xv, and set a first block column resistance component to a value obtained by multiplying the pixel column resistance component by Xv/Xh, the first block row resistance component being a row-wise resistance component of each of the power wires for each of the first blocks, the first block column resistance component being a column-wise resistance component of each of the power wires for each of the first blocks; and estimate a voltage drop amount distribution for the first blocks that is a distribution of amounts of voltage drop which occurs in the power wires when a current dependent on the video data flows through each of the first blocks, and regulate, based on the estimated voltage drop amount distribution, the voltage to be supplied to the display, wherein the voltage source supplies a first voltage and a second voltage to the display unit, the second voltage being different from the first voltage, the one or more power wires include a first power wire through which the first voltage is supplied and a second power wire through which the second voltage is supplied, and the voltage regulator is configured to estimate a first distribution and a second distribution for the first blocks, and regulate the first voltage and the second voltage based on the first distribution and the second distribution, respectively, the first distribution being a distribution of amounts of voltage drop which occurs in the first power wire, the second distribution being a distribution of amounts of voltage drop which occurs in the second power wire.

* * * * *